US008886631B2

(12) United States Patent
Abadi et al.

(10) Patent No.: US 8,886,631 B2
(45) Date of Patent: Nov. 11, 2014

(54) QUERY EXECUTION SYSTEMS AND METHODS

(75) Inventors: Daniel Abadi, New Haven, CT (US); Jiewen Huang, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 13/538,336

(22) Filed: Jun. 29, 2012

(65) Prior Publication Data

US 2012/0310916 A1 Dec. 6, 2012

Related U.S. Application Data

(63) Continuation-in-part of application No. 13/032,551, filed on Feb. 22, 2011.

(60) Provisional application No. 61/505,882, filed on Jul. 8, 2011, provisional application No. 61/396,895, filed on Jun. 4, 2010.

(51) Int. Cl.
*G06F 17/30* (2006.01)

(52) U.S. Cl.
CPC .... *G06F 17/30498* (2013.01); *G06F 17/30463* (2013.01); *G06F 17/30445* (2013.01); *G06F 17/30471* (2013.01); *G06F 17/30545* (2013.01)
USPC .......................................... 707/714; 707/713

(58) Field of Classification Search
CPC ..................... G06F 17/30595; G06F 17/30607
USPC .................................................. 707/713, 714
See application file for complete search history.

(56) References Cited

U.S. PATENT DOCUMENTS

| 4,412,130 | A | 10/1983 | Winters |
|---|---|---|---|
| 4,615,870 | A | 10/1986 | Armstrong et al. |
| 5,179,699 | A | 1/1993 | Iyer et al. |
| 5,413,154 | A | 5/1995 | Hurst, Jr. et al. |
| 6,357,536 | B1 | 3/2002 | Schrader et al. |
| 7,085,769 | B1 | 8/2006 | Luo et al. |

(Continued)

FOREIGN PATENT DOCUMENTS

| WO | WO-2011/153239 A2 | 12/2011 |
|---|---|---|
| WO | WO-2011/153242 A1 | 12/2011 |
| WO | WO-2013/009503 A2 | 1/2013 |

OTHER PUBLICATIONS

Abouzeid, Azza et al., "HadoopDB: An Architectural Hybrid of MapReduce and DBMS Technologies for Analytical Workloads", Proceedings of VLDB, (2009).

(Continued)

*Primary Examiner* — Rehana Perveen
*Assistant Examiner* — Tiffany Thuy Bui
(74) *Attorney, Agent, or Firm* — Mintz Levin Cohn Ferris Glovsky and Popeo, P.C.

(57) ABSTRACT

System, method and computer program product for processing a query are disclosed. Query processing includes partitioning the stored data into a plurality of partitions based on at least one vertex in the plurality of vertexes, storing at least another triple in the plurality of triples on the at least one node, assigning, based on the triple containing the at least one vertex, at least one partition in the plurality of partitions corresponding to the triple to at least one node in the plurality of nodes, and processing, based on the assigning, the query by processing the plurality of partitions.

39 Claims, 30 Drawing Sheets

(56) References Cited

U.S. PATENT DOCUMENTS

| | | | |
|---|---|---|---|
| 7,957,365 B2* | 6/2011 | Hsu et al. ................. | 370/351 |
| 8,069,210 B2 | 11/2011 | Gillum et al. | |
| 8,555,265 B2 | 10/2013 | Chambers et al. | |
| 2005/0092523 A1 | 5/2005 | McCaskill et al. | |
| 2005/0183574 A1 | 8/2005 | Burnett et al. | |
| 2005/0263541 A1 | 12/2005 | Hoff et al. | |
| 2006/0117036 A1 | 6/2006 | Cruanes et al. | |
| 2007/0038659 A1 | 2/2007 | Datar et al. | |
| 2008/0086442 A1 | 4/2008 | Dasdan et al. | |
| 2008/0098370 A1 | 4/2008 | Fontoura et al. | |
| 2008/0120314 A1 | 5/2008 | Yang et al. | |
| 2008/0126397 A1* | 5/2008 | Alexander et al. ............ | 707/102 |
| 2008/0243908 A1* | 10/2008 | Aasman et al. ............... | 707/102 |
| 2009/0055370 A1 | 2/2009 | Dagum et al. | |
| 2009/0132474 A1 | 5/2009 | Ma et al. | |
| 2009/0271412 A1 | 10/2009 | Lacapra et al. | |
| 2009/0319550 A1 | 12/2009 | Shau et al. | |
| 2010/0083194 A1* | 4/2010 | Bagherjeiran et al. ............ | 716/2 |
| 2010/0114628 A1* | 5/2010 | Adler et al. ............ | 707/E17.124 |
| 2010/0241644 A1* | 9/2010 | Jackson et al. ................ | 707/760 |
| 2010/0241828 A1 | 9/2010 | Yu et al. | |
| 2010/0281166 A1 | 11/2010 | Buyya et al. | |
| 2011/0191361 A1 | 8/2011 | Gupta et al. | |
| 2011/0202534 A1* | 8/2011 | Allerton ........................ | 707/738 |
| 2011/0302151 A1 | 12/2011 | Abadi et al. | |
| 2011/0302226 A1 | 12/2011 | Abadi et al. | |
| 2011/0302583 A1 | 12/2011 | Abadi et al. | |
| 2011/0314019 A1* | 12/2011 | Jimenez Peris et al. ...... | 707/737 |
| 2011/0320431 A1* | 12/2011 | Jackson et al. ................ | 707/713 |

OTHER PUBLICATIONS

Chen, Qiming et al., "Efficiently Support MapReduce—Like Computation Models Inside Parallel DBMS", Proceedings of the 2009 International Database engineering & Applications Symposium, Series—Ideas, pp. 43-53, (2009).

Choi, Hyunsik, et al., "Spider", Proceedings of the 18th ACM Conference on Information and Knowledge Management, CIKM, pp. 2087-2088, (2009).

Dean, et al., "MapReduce: Simplified Data Processing on Large Clusters", Communications of the ACM, 51:1 (2008).

Elmasri et al., "Fundamentals of Database Systems", Fourth Edition, (2004).

Gennick, Jonathan, et al., "Oracle SQL*Loader: The Definitive Guide", pp. 1-242 (2001).

Graefe, G., "Query Evaluation Techniques for Large Databases", ACM Computing Surveys, ACM, 25:2, pp. 73-170, (1993).

Guo, Y., et al., "Lubm: A benchmark for owl knowledge base systems," J. Web Sem., 3(23):158-182, (2005).

Ideros, S., et al., "Database cracking", CIDR '07, pp. 68-78, (2007).

Ideros, S., et al., "Self-organizing tuple reconstruction in column-stores", SIGMOD '09, pp. 297-30, (2009).

Kossman, D., "The State of the Art in Distributed Query Processing", ACM Computing Surveys, 32:4, pp. 422-469 (2000).

Neumann, T., et al., "The rdf-3x engine for scalable management of rdf data," The VLDB Journal, 19:91-113, (2010).

PeterS@AWS, "Processing and Loading Data from Amazon S3 to the Vertica Analytic.Database", http://aws.amazon.com/articles/2571 (2009).

Rohloff, K., et al., "High-performance, massively scalable distributed systems using the mapreduce software framework: The shard triple-store. International Workshop on Programming Support Innovations for Emerging Distributed Applications," (2010).

SPARQL Query Language for RDF, W3C Working Draft 4, (2006).

Stonebraker, Michael et al., "MapReduce and Parallel DBMSs: Friends or Foes?", Communications of the ACM, 53:1, p. 64, (2010).

Yang, Christopher et al., "Osprey: Implementing MapReduce—Style Fault Tolerance in a Shared-Nothing Distributed Database", Data Engineering (ICDE), IEEE 26th International Conference pp. 657-668, (2010).

Ying Yan, et al., "Efficient Indices Using Graph Partitioning in RDF Triple Stores", Data Engineering, 2009, ICDE, IEEE 25th International Conference on Engineering, pp. 1263-1266, (2009).

Zukowski, M., "Balancing Vectorized Query Execution with Bandwidth-Optimized Storage", Ph.D. Thesis, Universiteit van Amsterdam, Amsterdam, The Netherlands, (2009).

International Search Report for PCT/US2011/038763 mailed Aug. 26, 2011.

International Search Report for PCT/US2012/044981 mailed Apr. 11, 2014.

International Search Report for PCT/US2011/038758 mailed Mar. 14, 2013.

* cited by examiner

FIG. 17a.

This algorithm assumes an undirected $n$-hop guarantee and the input query $G = \{V, E\}$ is an undirected graph.

function IsPWOC(Input: $G$, $n$, Output: Boolean)

core=$v$, s.t. DoFE($v, G$)$\leq$DoFE($v', G$), $\forall v' \in V$
return (DoFE(core, $G$) $\leq n$)

function DoFE(Input: $G$, Vertex $v$, Output: Int)

$\forall e = (v_1, v_2) \in E$, compute
min(distance($v, v_1$), distance($v, v_2$)) + 1,
denoted by dist($v, e$)
return dist($v, e$) s.t. dist($v, e$) $\leq$ dist($v, e'$), $\forall (v', e') \in E$

FIG. 17b

This algorithm assumes a directed $n$-hop guarantee and the input query $G = \{V, E\}$ is a directed graph.

function IsPWOC(Input: $G, n$, Output:Boolean)
  core=$v$, s.t. DoFE($v, G$)≤DoFE($v', G$), $\forall v' \in V$
  return (DoFE(core, $G$) ≤ $n$)

function DoFE(Input: $G$, Vertex $v$, Output: Int)
  $\forall e = (v_1, v_2) \in E$, compute
    distance($v, v_1$) + 1, denoted by dist($v, e$)
  return dist($v, e$) s.t. dist($v, e$) ≥ dist($v, e'$), $\forall e' \in E$ This algorithm assumes an undirected n-hop guarantee and the input query $G = \{V, E\}$ is an undirected graph. The optimizations for high-degree vertexes are turned on.

function IsPWOC(Input: $G$, $n$, Output: Boolean)
    mark every vertex in $G$ that is typed
    unmark every vertex $G$ that is typed high degree
    core=$v$, s.t. DoFE($v, G$)$\leq$DoFE($v', G$), $\forall v' \in V$
    return (DoFE(core, $G$) $\leq n$)

function DoFE(Input: $G$, Vertex $v$, Output: Int)
    $\forall e = (v_1, v_2) \in E$, compute
      min(Distance($v, v_1$), Distance($v, v_2$)) + 1,
      denoted by dist($v, e$)
    return dist($v, e$) s.t. dist($v, e$) $\geq$ dist($v, e'$), $\forall e' \in E$ function Distance(Input: $G$, Vertexes $v$, $w$, Output: Int)
    if $v$ is unmarked
      if $w$ is $v$'s neighbor in $G$
        return 1
      else
        return infinity
    else
      return the length of shortest path between $v$ and $w$,
      of which all vertexes must be marked except $w$

Let $G = \{V, E\}$ be input graph. Let $R$ be the vertex to machine assignment, namely, a binary relation $(V, N)$. $n$ is the undirected hop guarantee.

function TriplePlacement(Input:edges $E$, binary relation $R$, 
Output: placement $(E, N)$ with undirected $n$-hop guarantee )
$B_0 = R$
for $i$ from 1 to $n$
$\quad \{A_i, B_i\} = \text{OneHopExpansion}(E, B_{i-1})$
return $A_1 \cup A_2 \cup ... \cup A_n$ function OneHopExpansion(Input:edges $E$, binary relation $(V, N)$, Output: binary relations $A$ $(E, N)$, $B$ $(V, N)$
$A = \emptyset, B = \emptyset$
Map: Input: $(v_1, v_2)$ OR $(v, \text{partition id})$
$\quad$ if input is $(v_1, v_2)$
$\quad\quad$ emit $(v_1, (v_1, v_2))$ and $(v_2, (v_1, v_2))$
$\quad$ else
$\quad\quad$ emit $(v, \text{partition id})$
Reduce: Input: $(v, \text{partition ids } I \cup \text{edges } E')$
$\quad$ for each $(v_1, v_2) \in E'$ and each $i \in I$
$\quad\quad$ add $(((v_1, v_2)), i)$ to $A$
$\quad\quad$ if $v_1 = v$
$\quad\quad\quad$ add $(v_2, i)$ to $B$
$\quad\quad$ else
$\quad\quad\quad$ add $(v_1, i)$ to $B$ return $\{A, B\}$

FIG. 21.

| Query | RDF-3X | 5 machines | 10 machines | 20 machines |
|---|---|---|---|---|
| 1 | 0.05 | 0.40 | 0.40 | 0.41 |
| 2 | 428.77 | 1.98 | 1.25 | 0.84 |
| 3 | 0.08 | 0.44 | 0.41 | 0.48 |
| 4 | 0.17 | 0.48 | 0.42 | 0.40 |
| 5 | 0.05 | 0.49 | 0.43 | 0.42 |
| 6 | 1628.31 | 32.46 | 16.72 | 8.83 |
| 7 | 0.71 | 0.40 | 0.43 | 0.43 |
| 8 | 0.45 | 0.40 | 0.40 | 0.43 |
| 9 | 11.97 | 12.6 | 4.03 | 2.34 |
| 10 | 0.12 | 0.43 | 0.45 | 0.48 |
| 11 | 0.41 | 0.41 | 0.41 | 0.42 |
| 12 | 0.10 | 0.42 | 0.40 | 0.43 |
| 13 | 91.94 | 0.74 | 0.59 | 0.55 |
| 14 | 281.88 | 25.97 | 12.75 | 6.76 |

FIG. 22.

| Name | Guarantee | High-degree Optimizations |
|---|---|---|
| un-two-hop-on | undirected-two-hop | on |
| un-two-hop-off | undirected-two-hop | off |
| un-one-hop-on | undirected-one-hop | on |
| un-one-hop-off | undirected-one-hop | off |
| dir-two-hop-off | directed-two-hop | off |
| dir-one-hop-off | directed-one-hop | off |

FIG. 23.

| Configuration | Total Triples | Ratio to Hash |
|---|---|---|
| Hash Partitioning | 276M | 1 |
| dir-one-hop-off | 325M | 1.18 |
| un-1-hop-on | 330M | 1.20 |
| un-1-hop-off | 333M | 1.21 |
| dir-two-hop-off | 329M | 1.19 |
| un-2-hop-on | 338M | 1.22 |
| un-2-hop-off | 1,254M | 4.54 |

| Query | #joins | #s-s joins | #s-o joins |
|---|---|---|---|
| 1 | 1 | 1 | 0 |
| 2 | 6 | 3 | 3 |
| 3 | 1 | 1 | 0 |
| 4 | 4 | 4 | 0 |
| 5 | 1 | 1 | 0 |
| 6 | 0 | 0 | 0 |
| 7 | 3 | 1 | 2 |
| 8 | 4 | 3 | 1 |
| 9 | 6 | 3 | 3 |
| 10 | 1 | 1 | 0 |
| 11 | 2 | 1 | 1 |
| 12 | 3 | 2 | 1 |
| 13 | 1 | 1 | 0 |
| 14 | 0 | 0 | 0 |

FIG. 24.

QUERY EXECUTION SYSTEMS AND METHODS

CROSS-REFERENCE TO RELATED APPLICATIONS

The present application claims priority to U.S. Provisional Patent Application No. 61/505,882 to Abadi, filed Jul. 8, 2011, and entitled "Scalable SPARQL Querying of Large RDF Graphs". The present application is also is a continuation-in-part of U.S. patent application Ser. No. 13/032,551 to Abadi et al., filed Feb. 22, 2011, and entitled "Query Execution Systems and Methods," which claims priority to U.S. Provisional Patent Application No. 61/396,895 to Abadi, filed on Jun. 4, 2010, and entitled "Split Query Execution Strategies Across Hadoop and Database Systems" and incorporates disclosures of the above applications herein by reference in their entireties.

TECHNICAL FIELD

The present application generally relates to systems and methods for analytical data management, and in particular, to systems and methods for performing a data warehousing query. In some embodiments, the present application relates to performing of queries of data stored in a graph data model in a data store.

BACKGROUND

Large scale data processing involves extraction of data of interest from a set of raw data located in one or more databases and then processing the extracted data into desired form. Extraction is accomplished through requests, or queries, which are executed on the stored data. Because significant portions of data are extracted from large of amounts of data stored and subsequently formatted, such queries are typically complex and require development of a particular execution plan as well as considerable processing time. Many conventional techniques have been known to process such queries. Some of these include a MapReduce technique.

In order to execute a complex data warehousing query in a MapReduce-based system, such query needs to be translated into a series of MapReduce ("MR") jobs. Since each MR job typically involves many input/output ("I/O") operations and network transfers, an efficient query execution plan is typically composed of as few MR jobs as possible. Moreover, each job attempts to minimize the amount of data written to disk or sent over network.

Some conventional systems employ MapReduce as an extremely popular framework for performing scalable parallel advanced analytics and data mining. Despite the fact that there is nothing fundamentally new about the technology, the availability of a free and open source implementation (see, e.g., http://hadoop.apache.org ("Hadoop")), along with its heavy utilization and evangelization by two of the largest Web companies in the world (Google and Yahoo), stellar performance on extreme-scale benchmarks, and impressive ease-of-use experience, has lead to its rapid adoption for many different kinds of data analysis and data processing.

Historically, main applications of the MapReduce framework were in the Web indexing, text analytics, and graph data mining areas. However, as MapReduce continues its steady progression towards becoming the de facto data analysis standard, it has started to be used for structured data analysis tasks traditionally dominated by relational databases in data warehouse deployments. Even though there are many who argue that MapReduce is not optimal for structured data analysis tasks, it is nonetheless being used increasingly frequently for these tasks due to the desire to unify the data management platform. Thus, the standard, structured data analysis can proceed side-by-side with the complex analytics that MapReduce is well-suited for, along with the superior scalability of MapReduce and lower price. For example, Facebook famously ran a proof of concept comparing multiple parallel relational database vendors before deciding to run their 2.5 petabyte clickstream data warehouse using Hadoop instead.

Consequently, there has been a significant amount of research and commercial activity in recent years with the goal of integrating MapReduce and relational database technology. This activity can be divided into two main directions: (1) starting with a parallel database system and adding MapReduce technology (or at least a MapReduce interface), and (2) starting with MapReduce (typically the Hadoop implementation) and adding database system technology.

However, there have been many performance problems with Hadoop systems when applied to structured data because of an unoptimal storage layer. The default Hadoop system's storage layer is the Hadoop distributed file system ("HDFS"). Hadoop has been implemented with an open-source data warehousing infrastructure that has been built on top of Hadoop (see, e.g., http://hadoop.apache.org/hive ("Hive")). Facebook, which was the creator and main user of Hive, is currently managing an over 700 TB dataset (before replication), with 5 TB added daily. Over 7500 requests (or jobs) are submitted each day to analyze more than 75 TB of compressed data. Hive provides tools that enable data summarization, adhoc querying and analysis of detail data as well as a mechanism to impose structure on the data. In addition, it also provides a simple query language called QL or HiveQL, which is based on SQL and enables users familiar with SQL to do adhoc querying, summarization and data analysis. At the same time, this language also allows traditional MapReduce programmers to plug in their custom mappers and reducers more sophisticated analysis capabilities which may not be supported by the built-in capabilities of the language. Hive accepts queries expressed in HiveQL and executes them against data stored in HDFS. The relational mapping over the data is maintained in a system catalog called Metastore.

Hive's query compiler processes HiveQL statements in a series of steps. First, query parsing and validation against metadata (table definitions and data types) is performed. Next, the resulting operator DAG is transformed by the optimizer. Hive supports the following rule-based transformations: column pruning, predicate pushdown, join reordering, and partition pruning. After optimization, the logical query plan is translated into a physical plan—a series of MapReduce jobs and HDFS tasks. Hive's query executor coordinates the execution of each stage of the query plan. Custom operations, such as map side joins, hash-based partial aggregations, and repartitioned group by to handle skew are applied during runtime when appropriate. Intermediate data are stored into HDFS as temporary tables. A major limitation of the Hive data warehouse is its data storage layer. By employing a distributed file system, Hive is unable to utilize hash-partitioning and collocation of related tables, a typical strategy parallel databases exploit to minimize data movement across nodes. Moreover, Hive workloads are very I/O heavy due to lack of indexing. Furthermore, the system catalog lacks statistics on data distribution and Hive's optimizer is quite unsophisticated because no cost-based or adaptive algorithms were applied.

Thus, there is a need for a more efficient data processing systems and methods for obtaining large-size data from even bigger data sets stored in databases through execution of requests or queries.

SUMMARY

In some implementations, the current subject matter relates to a computer-implemented method for processing a query, having at least one query parameter, of data stored on a plurality of nodes in accordance with a graph data model. The graph data model can include a plurality of vertexes configured to be logically connected using a plurality of edges. Each vertex in the plurality of vertexes can be configured to correspond to a portion of data. The portion of data can be configured to be stored at a node in the plurality of nodes and at least one vertex in the plurality of vertexes can be configured to be logically connected to at least another vertex in the plurality of vertexes using at least one edge in the plurality of edges. Two vertexes logically connected by an edge can be configured to form a triple in a plurality of triples. The method can include partitioning the stored data into a plurality of partitions based on at least one vertex in the plurality of vertexes, storing at least another triple in the plurality of triples on the at least one node, assigning, based on the triple containing the at least one vertex, at least one partition in the plurality of partitions corresponding to the triple to at least one node in the plurality of nodes, and processing, based on the assigning, the query by processing the plurality of partitions. At least one of the partitioning, the storing, the assigning, and the processing can be performed on at least one processor.

In some implementations, the current subject matter can be configured to include one or more of the following optional features. The method can also include determining other vertexes logically connected to the at least one vertex and selectively replicating triples containing the determined vertex to the at least one node for processing. The method can further include determining whether triples already existing in the partition and the replicated triples include duplicative triples and excluding duplicative triples from the processing.

The graph data model can be a directed graph data model. The graph data model can include a resource description framework data.

In some embodiments, the processing can include excluding processing of triples contained within partitions wherein the triples have a predetermined type.

In some embodiments, the method can include determining whether the at least one vertex is configured to be logically connected to other vertexes contained in the plurality of nodes using a plurality of logical connections, wherein the plurality of logical connections is configured to exceed a predetermined threshold and excluding, based on the determining, the at least one other vertex having the plurality of logical connections exceeding the predetermined threshold from the partitioning.

In some embodiments, the method can also include determining whether the received query can be processed in parallel on the plurality of nodes, and dividing, based on the determining, the received query into a plurality of sub-queries.

The plurality of partitions can include a plurality of disjoint partitions.

The triple can be stored in a memory of at least one node in the plurality of nodes.

At least one query parameter can include at least one of the following: at least one constant parameter and at least one variable parameter. The method can also include determining a sub-graph pattern of the query parameters, wherein two query parameters and a logical connection between the two query parameters are configured to form a query triple in a plurality of query triples, comparing the sub-graph pattern of the query parameters to the graph data model containing the plurality of vertexes by comparing the plurality of triples in the graph data model to the plurality of query triples, determining, based on the comparing, whether an identical match exists between at least one triple in the plurality of triples in the graph data model and at least one query triple in the plurality of query triples when the query triple includes two constant parameters configured to match two vertexes in the at least one triple in the plurality of triples in the graph data model, a vertex in the plurality of vertexes in the graph data model to match a variable parameter in a query triple in the plurality of query triples, the query triple including a constant parameter and the variable parameter and the constant parameter is configured to match another vertex in the plurality vertexes.

In some embodiments, the variable parameter can include at least one of the following: at least one edge in the plurality of edges and at least one vertex in the plurality of vertexes. A a sub-graph query can be configured to include at least one of the following: at least one constant vertex, at least one constant edge, at least one variable vertex, and at least one variable edge, wherein at least one constant vertex and at least one constant edge is configured to match at least one vertex and at least one edge in the graph data mode, respectively.

The processing can be configured to be performed in parallel using Apache Hadoop.

In some embodiments, the current subject matter relates to a method for processing data in a database system containing a plurality of nodes. The method includes receiving a query for processing of data, wherein the data is stored in a table in a plurality of tables, wherein the table is stored on at least one node within the database system, determining an attribute of the table and another table in the plurality of tables, partitioning one of the table and another table in the plurality of tables using the determined attribute into a plurality of partitions, and performing a join of at least two partitions of the table and another table using the determined attribute. The join is performed on a single node in the database system. In some embodiments, the table is smaller than another table. In alternate embodiments, the table is configured to be distributed to all nodes containing a partition of another table, the table and the partition of another table being partitioned on determined attribute. The smaller table can be a dictionary table.

In some embodiments, the method further includes determining a join attribute for each table partition of the stored data, determining whether to re-partition at least one table of the stored data using the join attribute such that partitions of tables having the same join attribute are joined at a single node in the database system, and using the join attribute, performing a join of tables at the single node.

In alternate embodiments, the method further includes selecting a column within a table to generate the column join attribute for the step performing of the join and using the column join attribute, performing a join of tables at the single node in the database system.

In some embodiments, the method also includes initiating a first processing task and using the initiated first processing task, performing the partitioning and joining steps. A second processing task can be initiated during which selecting and joining steps are performed. The first processing task and the second processing task can be MapReduce processing tasks.

In some embodiments, the current subject matter relates to a system for processing data in a database system containing a plurality of nodes. The system includes a receiving module configured to be received a query for processing of data, wherein the data is stored in a table in a plurality of tables, wherein the table is stored on at least one node within the database system. The system also includes a partitioning module configured to partition one of the table and another table in the plurality of tables using a determined attribute into a plurality of partitions, wherein the determined attribute is an attribute of the table and another table. A join module can be configured to perform a join of at least two partitions of the table and another table using the determined attribute. The join is performed on a single node in the database system.

In some embodiments, the current subject matter relates to a computer program product, tangibly embodied in a computer-readable medium, the computer program product being operable to cause a data processing system containing a database system having a plurality of nodes, to perform operations including receiving a query for processing of data, wherein the data is stored in a table in a plurality of tables, wherein the table is stored on at least one node within the database system, determining an attribute of the table and another table in the plurality of tables, partitioning one of the table and another table in the plurality of tables using the determined attribute into a plurality of partitions, and performing a join of at least two partitions of the table and another table using the determined attribute. The join is performed on a single node in the database system.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The current subject matter is described with reference to the accompanying drawings. In the drawings, like reference numbers indicate identical or functionally similar elements.

FIGS. 17a-c illustrate exemplary determinations of whether a query is a parallelizable-without-communication query, according to some embodiments of the current subject matter.

FIG. 17d illustrates an exemplary triple placement algorithm, according to some embodiments of the current subject matter.

FIG. 21 is a chart illustrating execution of queries on a RDF-3X data using 5, 10, and 20 nodes/machines.

FIG. 22 is a chart illustrating optimization of high-degree/highly connected vertexes in a graph data model, according to some embodiments of the current subject matter.

FIG. 23 illustrates exemplary triple counts and normalized counts for vertexes in the graph data model in relation to hash partitioning, according to some embodiments of the current subject matter.

FIG. 24 is a chart illustrating various joins performed by experimental queries.

DETAILED DESCRIPTION

Figure 1:
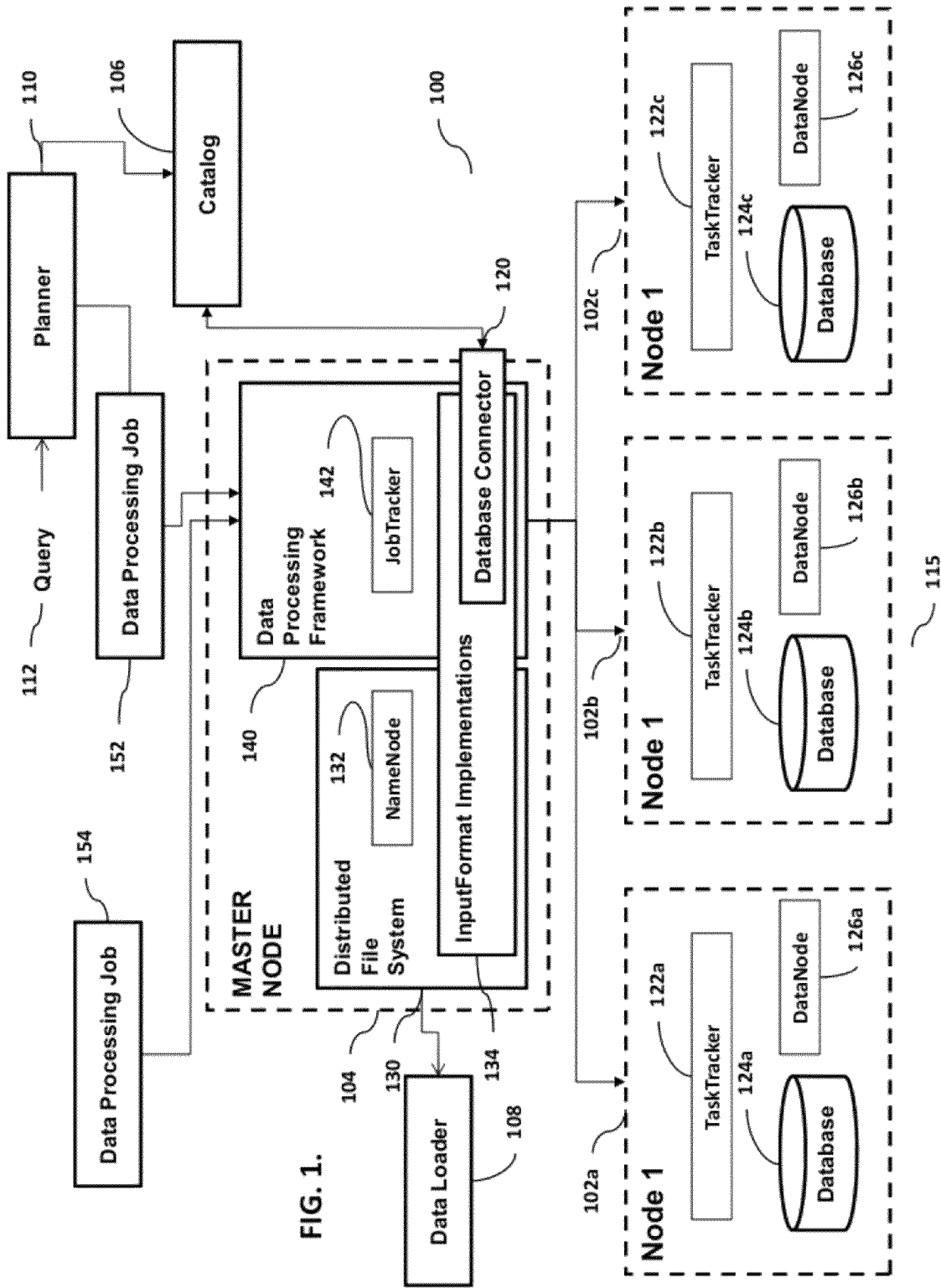
FIG. 1 illustrates an exemplary embodiment of a system for data processing, according to some embodiments of the current subject matter.

FIG. 1 illustrates an exemplary data processing system 100, according to some embodiments of the current subject matter. The system 100 can be configured to connect a plurality of nodes 102 (a, b, c) with a master node 104. A master node 104 may be configured to receive a processing task (e.g., a query) and distribute various processing tasks involved in the query to nodes 102. In some embodiments, the nodes can be configured to be connected using a communication layer (not shown in FIG. 1). In some embodiments, a MapReduce ("MR") framework can be used as such communication layer. As can be understood by one having ordinary skill in the art, other types of frameworks can be used and the current subject matter is not limited to the MR framework. Each node 102 is configured to include a task tracker component 122, a database 124, and a data node 126. As shown in FIG. 1, the system 100 further includes the following components/processing components: a database connector component 120, a catalog component 106, a data loader component 108, and a query execution planning component or planner 110. A query (e.g., an SQL query) for processing on nodes 102 can be received by the planner 110. The planner 112 can be configured to communicate with the master node 104's database processing framework 140 that can be further configured to generate various tasks and pass them onto the nodes 102 for processing, as discussed below. By way of an example. The database processing framework 140 can include a MapReduce framework or any type of framework. As can be understood by one skilled in the art, the current subject matter is not limited to the any particular database processing framework. In some embodiments, a partition of a data processing task can refer to an execution of a series of processing tasks (such as relational operators) on a partition of data (as may be the case for tasks assigned to database systems) or an execution of a series of processing tasks on an entire dataset (as may be the case for a partition assigned to a data processing framework).

In some embodiments, the system 100 can be configured to implement a distributed file system ("DFS") that can be used for connecting multiple single-node database systems and can be configured as a task coordinator and a network communication layer. In some embodiments, received queries can be parallelized across nodes using the framework 140 and the system 100 can be further configured to distribute processing of a query to single-node's databases 124 (a, b, c). For example, upon receipt of a query 112 (or a data processing task), a query execution plan can be generated, whereby the query can be broken up into various partitions, parts and/or tasks, which can be further distributed across the nodes 102 (a, b, c) in a cluster for processing. In some embodiments, such processing can occur in parallel on all nodes 102 that receive a query task. Distribution of tasks can be done based on node availability and capacity. For example, a node cannot receive more data than it can optimally store and/or handle/manage. If data is to be loaded into the database nodes, the data can be broken up/partitioned into a plurality of portions and distributed across nodes based on various factors, including but not limited to, capacity, node's ability to process specific data, etc. Upon distribution of data and/or tasks to independent nodes, each node can be configured to process the tasks/data and the system 100 can be configured to coordinate such processing and node performance (e.g., a job tracker 142 can be configured to coordinate and monitor node-processing and performance). In some embodiments, portions (or partitions) of data/task can be independent of one another, while other portions can require inter-node communication and coordination to process a task. The independent portions might not require such coordination/communication. The catalog storage component 106 can be configured to maintain/track information about each data partition being sent to nodes 102. Through such distribution, use of various scheduling tools, and job tracking, the system 100 can be configured to achieve an excellent fault tolerance and ability to operate in heterogeneous environments. The system 100 can further achieve great performance of parallel databases by processing queries inside engines of databases 124.

Referring back to FIG. 1, system 100 further includes two layers: (i) a data storage layer or a distributed file system ("DFS") 130, and (ii) a data processing layer or framework 140. DFS 130 is shown as a block-structured file system that can be managed by a central name node 132 (shown as "NameNode"). In operation, individual files can be broken into blocks of a predetermined fixed size and distributed across multiple data nodes 102 (a, b, c) in the cluster 115, where the cluster 115 consists of multiple single nodes 102. The name node 132 can be configured to maintain metadata about size and location of blocks and their replicas. As stated above, the catalog component 106 can be further configured to keep track of how and where the data is distributed.

As shown in FIG. 1, the data processing layer 140 follows simple master-slave architecture. The master is the master node 104 that includes a single job tracker 142 contained and the slaves or worker nodes are nodes 102(a, b, c) that include task trackers 122 (a, b, c). The job tracker 142 can handle runtime scheduling of data processing jobs 152, 154 (e.g., MapReduce jobs) and maintain information on each task tracker 122's load and available resources. The task trackers 122 can handle processing of processing of part or all of the data processing jobs that are assigned to them by the job tracker 142. Each processing job can be broken down into various phases, each of which includes a plurality of sub-tasks or sub-phases that perform processing based on the number of data blocks that require such processing. The job tracker 142 assigns tasks/sub-phases to task trackers 122 based on locality and load balancing. Locality can be determined by matching task trackers 122 to appropriate tasks that process data, which is local to them. The job tracker 142 can perform load-balancing by ensuring all available task trackers are assigned tasks. Task trackers 122 regularly update the job tracker 142 with their status through "heartbeat messages." A heartbeat message is a message sent from an origin (i.e., a task tracker) to a destination (i.e., a job tracker) that enables the destination to identify if and when the origin fails or is no longer available.

As shown in FIG. 1, the system 100 further includes an input format implementations library 134 which can be configured to be an interface between the storage layer 130 and the processing layer 140. The input format implementations library 134 can be configured to parse text/binary or other types of files (or connect to arbitrary data sources) and to transform the data into key-value pairs that can be processed during one of the above phases. By way of an example, conventional Hadoop system can be configured to provide several input format implementations including one that allows single JAVA® database connectivity ("JDBC")-compliant database to be accessed by all tasks in one job in a given cluster.

Figure 2:
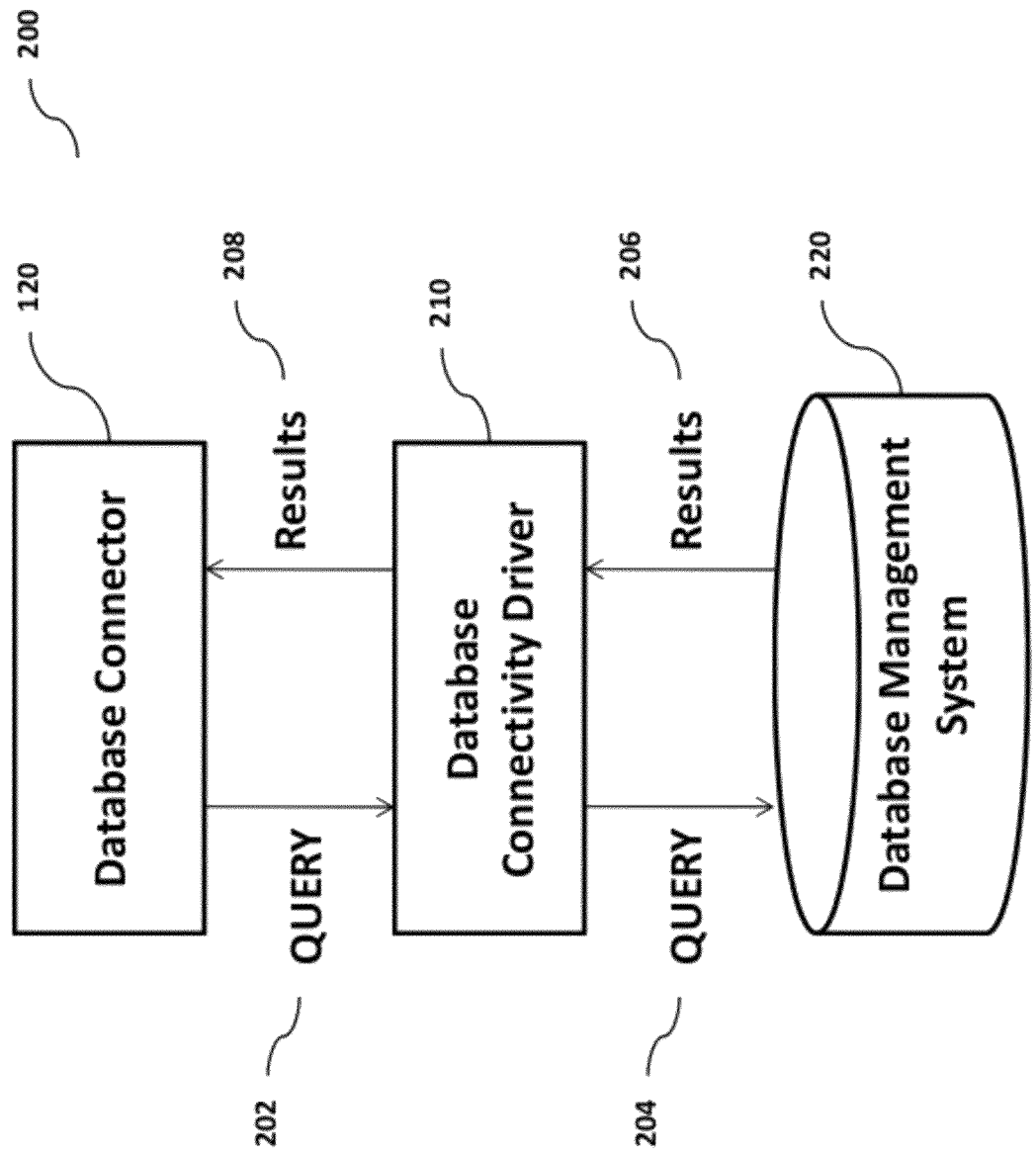
FIG. 2 illustrates an exemplary database connector component of the system shown in FIG. 1, according to some embodiments of the current subject matter.

In some embodiments, the database connector 120 can be configured to provide an interface between database systems 124 residing on nodes 102 in the cluster 115 and task trackers 122. The database connector 120 can be configured to be a part of the input format implementations library 134. In some embodiments, during query (phase, sub-phase, or task) processing/execution the connector 120 receives a data processing query (e.g., an SQL or any other type of programming language query) and appropriate connection parameters, which include, but are not limited to, which drivers to use, query fetch size and other query tuning parameters. The connector 120 is configured to connect to the database 124, execute the query and return results as key-value pairs. In some embodiments, the connector 120 can be configured to connect to any database that resides in the cluster 115. Prior to processing, queries can be configured to be optimized in accordance with requirements of a specific database. In some embodiments, examples of such databases include, but are not limited to, MySQL, PostgreSQL, column-store (i.e., storing content by columns rather than by rows) databases (e.g., open-source, MonetDB, InfoBright, etc.), and other database systems. Other types of database systems can be used with the system 100 and the current subject matter is not limited to the above-referenced database systems. FIG. 2 illustrates an exemplary operation 200 of the database connector 120, according to some embodiments of the current subject matter. As stated above, the database connector can receive a query for processing (e.g., obtaining specific data from a database management system 220, which can include databases 124). The query is initially processed by the database connector 120 and passed on (at 202) to a database connectivity driver 210 (e.g., JAVA® Database Connectivity Driver). The driver 210 then passes (at 204) the query to the database management system 220 for obtaining data requested in the query received by the database connector 120. The database management system 220 returns requested data (at 206) via the database connectivity driver 210 to the database connector 120 (at 208).

In some embodiments, the catalog component 106 can be configured to communicate with the planner 110 and database connector 120. The catalog 106 can be further configured to store meta-information about the databases 124. The information includes, but is not limited to, the following information: (i) connection parameters such as database location, driver class and credentials, (ii) metadata such as data sets contained in the cluster, replica locations, and data partitioning properties. The catalog 106 can be configured to store such meta-information in various formats, such as an XML file, in the DFS 130. This file can be accessed by job tracker 142 and task trackers 122 to retrieve information necessary to schedule tasks and process data needed by a query.

Figure 3:
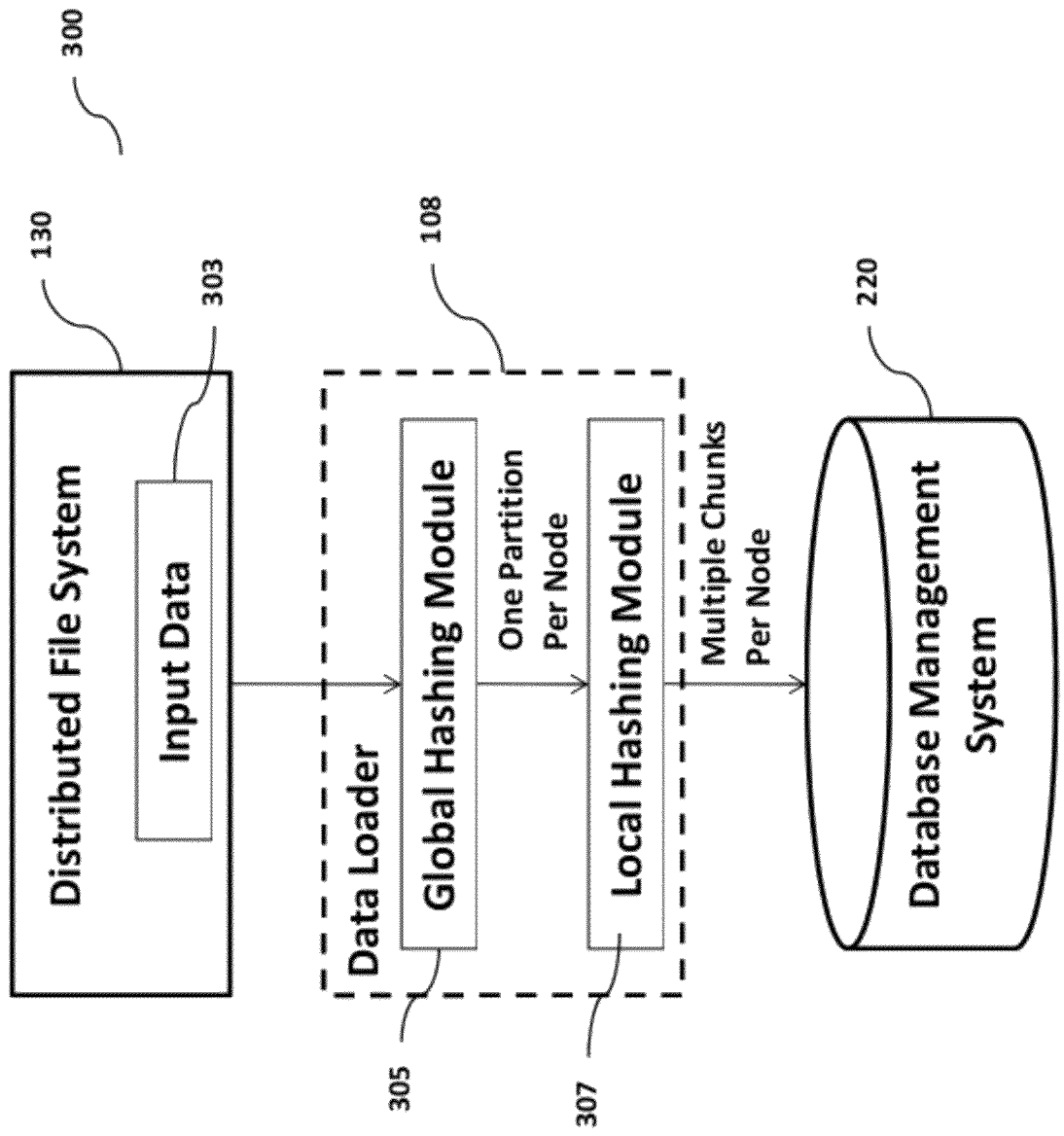
FIG. 3 illustrates an exemplary data loader component of the system shown in FIG. 1, according to some embodiments of the current subject matter.

In some embodiments, the data loader component 108 can be configured to (i) globally repartition data on a given partition key upon loading, (ii) break apart single node data into multiple smaller partitions or chunks and (iii) bulk-load the single-node databases with the chunks. FIG. 3 illustrates an exemplary operation 300 of the data loader component 108 in connection with system 100 shown in FIG. 1. The data loader 108 can include a global hashing component 305 and a local hashing component 307. The global hashing component 305 can be configured to read raw data files or input data 303 stored in the DFS 130 and repartition them into as many portions as there are nodes 102 in the cluster 115. The local hashing component 307 then copies a partition from the DFS 130 into a local file system of each node 102 and secondarily partitions the file into smaller sized chunks based on a predetermined maximum chunk size setting. In some embodiments, the maximum chunk setting can be predetermined by the system 100 or any other factors.

The hashing functions can be used by both the global hashing component 305 and the local hashing component 307 can be configured to be different in order to ensure that the resulting partitioned chunks have a uniform size. Additionally, the hashing functions can be further configured to ensure better load-balancing when executing processing phases/tasks over the stored data. Any hashing functions can be used for the global and/or local hashing components 305, 307.

Figure 4:
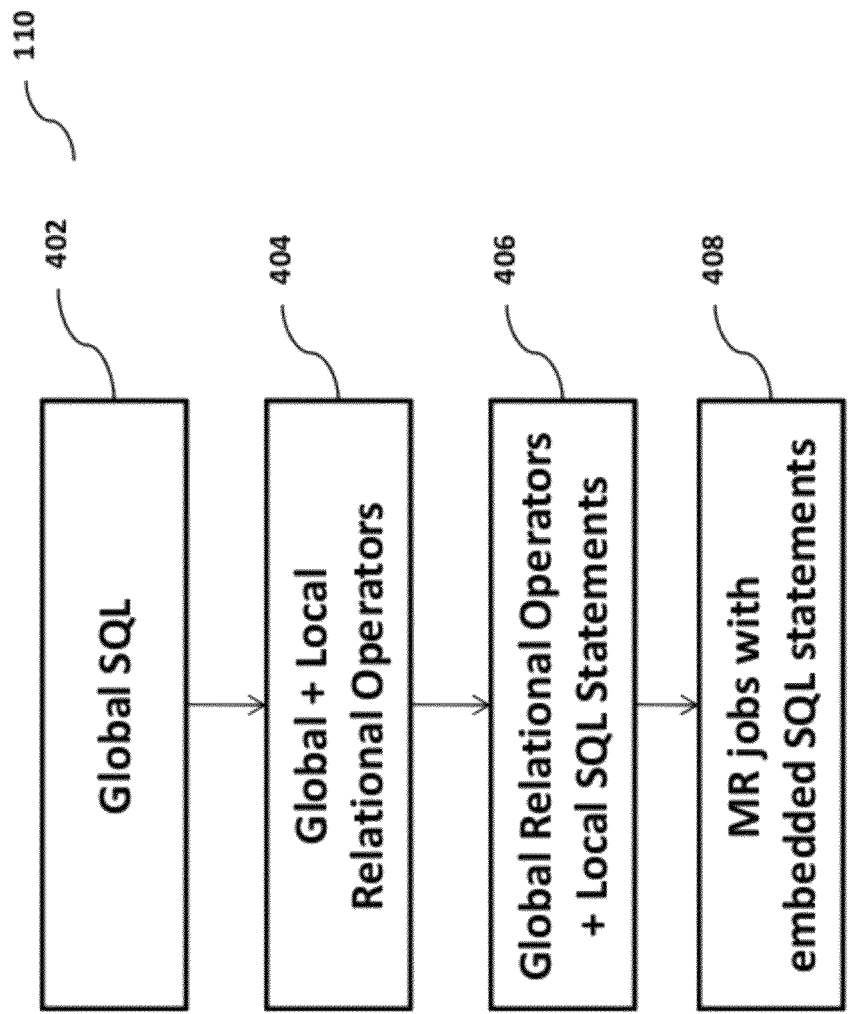
FIG. 4 illustrates an exemplary planner component of the system shown in FIG. 1, according to some embodiments of the current subject matter.

Thus, in some embodiments, the system 100 can be configured to provide a parallel database front-end for query processing purposes via the planner component 110. The planner 110 can be configured to provide an interface for the system 100 and can be further configured to receive a query 112 for further processing by the system 100. The planner 110 can be further configured to perform translation of the query into appropriate format in accordance with requirements of a particular database where data is stored. In some exemplary embodiments, as shown in FIG. 4, the planner 110 can transform SQL query(ies) (at 402) into global and local relational operators (at 404), which are then transformed into global relational operators and local SQL statements, respectively (at 406), and finally transformed into MapReduce job(s) (at 408). The MapReduce job(s) are then further transformed into SQL language for processing by the nodes in the system 100. In order to process data from the DFS 130, the planner 110 can be configured to implement various relational operators, such as, filter, select (project), join, and aggregation, which operate as iterators: each operator forwards a data tuple to the next operator after processing it (a data tuple is an ordered list of elements). In some embodiments, the DFS 130 can be configured to store data in tables, which can be collocated on a node 102 (some tables can be not collocated). Each table can be stored as a separate file in the DFS 130. The current subject matter can be configured to process all types of tables (including collocated and not collocated tables) and if such tables are partitioned on the same attribute (a common identifier to some elements in the tables), a join operation (i.e., merging of data from tables based on a predetermined join attribute) can be accomplished at the database layer in its entirety.

As stated above, the current subject matter can be configured to push as much query processing as possible into the single-node databases 124 by issuing various processing directive(s) (e.g., SQL or any other programming language statements, commands, functions, etc.). Such processing directives can include selection, projection, and partial aggregation, which can be performed during various phases of a query. Since the current subject matter implements a parallel database processing system, it is capable of providing higher performance due to more efficient operator implementation, better I/O handling, and clustering/indexing provided by its database management system ("DBMS"). Parallel database processing allows for a more efficient processing of co-partitioned tables (e.g., tables that have been hash partitioned on a join attribute) by processing join operations inside the database system of each node. By processing join operations in the database system, joins become local operations (no need to send data over the network) and are performed inside the DBMS which typically implements these operations very efficiently.

Further, the current subject matter's system 100 can be configured to handle processing of even more complicated queries that include multi-stage tasks/jobs, where data being processed is combined from both a database system and DFS 130. The following discussion outlines various query execution techniques and their optimization that can be performed by the system 100, in accordance with some embodiments of the current subject matter. Such optimization techniques can include, but are not limited to, referential partitioning, side joins, side split semi-joins, post-join aggregation, and pre join aggregation. The optimization techniques can be configured to minimize an amount of data that has to be processed between various tasks of a data processing task (in the MapReduce framework, a Map and Reduce tasks). Such processing can include reading/writing data to a disk or sending it over network that connects nodes 102, which can greatly slow processing of the queries. As can be understood by one having ordinary skill in the relevant art, the above-referenced optimization techniques are provided here for exemplary non-limiting purposes only and other optimization techniques are possible.

By way of a background for the following discussion, a "join" is configured to combine records from two or more tables in a database. It creates a set that can be saved as a table or used as is. A join is a means for combining fields from two tables by using values common to each. ANSI standard SQL specifies four types of joins: "inner", "outer", "left", and "right". In special cases, a table (base table, view, or joined table) can join to itself in a self-join. A programmer can write a join predicate to identify the records for joining. If the evaluated predicate is true, the combined record is then produced in the expected format, a record set or a temporary table, for example.

An inner join is the most common join operation used in applications and can be regarded as the default join-type Inner join creates a new result table by combining column values of two tables (A and B) based upon the join-predicate. The query compares each row of A with each row of B to find all pairs of rows which satisfy the join-predicate. When the join-predicate is satisfied, column values for each matched pair of rows of A and B are combined into a result row. The result of the join can be defined as the outcome of first taking the Cartesian product (or cross-join) of all records in the tables (combining every record in table A with every record in table B)—then return all records which satisfy the join predicate. One can further classify inner joins as equi-joins, as natural joins, or as cross-joins. An equi-join is a specific type of comparator-based join, or theta join, which uses only equality comparisons in the join-predicate. Using other comparison operators (such as <) disqualifies a join as an equi-join. A natural join offers a further specialization of equi-joins. The join predicate arises implicitly by comparing all columns in both tables that have the same column-name in the joined tables. The resulting joined table contains only one column for each pair of equally-named columns. A cross join, Cartesian join or product provides the foundation upon which all types of inner joins operate. A cross join returns the Cartesian product of the sets of records from the two joined tables. Thus, it equates to an inner join where the join-condition always evaluates to True or where the join-condition is absent from the statement. In other words, a cross join combines every row in B with every row in A. The number of rows in the result set will be the number of rows in A times the number of rows in B.

An outer join does not require each record in the two joined tables to have a matching record. The joined table retains each record—even if no other matching record exists. Outer joins subdivide further into left outer joins, right outer joins, and full outer joins, depending on which table(s) one retains the rows from (left, right, or both).

The result of a left outer join (or simply left join) for table A and B always contains all records of the "left" table (A), even if the join-condition does not find any matching record in the "right" table (B). This means that if the ON clause matches 0 (zero) records in B, the join will still return a row in the result—but with NULL in each column from B. This means that a left outer join returns all the values from the left table, plus matched values from the right table (or NULL in case of no matching join predicate). If the left table returns one row and the right table returns more than one matching row for it, the values in the left table will be repeated for each distinct row on the right table.

A right outer join (or right join) closely resembles a left outer join, except with the treatment of the tables reversed. Every row from the "right" table (B) will appear in the joined table at least once. If no matching row from the "left" table (A) exists, NULL will appear in columns from A for those records that have no match in B. A right outer join returns all the values from the right table and matched values from the left table (NULL in case of no matching join predicate).

A full outer join combines the results of both left and right outer joins. The joined table will contain all records from both tables, and fill in NULLs for missing matches on either side.

Conventional database-systems, which typically strive to implement efficient join techniques, because relational systems commonly call for joins, face great difficulties in optimizing their efficient execution. The problem arises because inner joins operate both commutatively and associatively. In practice, this means that the user merely supplies the list of tables for joining and the join conditions to use, and the database system has the task of determining the most efficient way to perform the operation. A query optimizer determines how to execute a query containing joins. A conventional query optimizer has two basic freedoms: (1) a join order and (2) a join method. Because joins function commutatively and associatively, the order in which the system joins tables does not change the final result-set of the query. However, join-order does have an enormous impact on the cost of the join operation, so choosing the best join order becomes very important. With regard to the join method, given two tables and a join condition, multiple algorithms can produce the result-set of the join. Algorithms that run most efficiently depend on the sizes of the input tables, the number of rows from each table that match the join condition, and the operations required by the rest of the query. The following is a description of the current subject matter's techniques for optimizing query execution operations in order to make them more efficient.

As stated above, there exist various types of joins, and thus, execution of queries calling for such joins can become an arduous task that involves many phases and subtasks that a system must perform in order to obtain the user-desired data set. In particular, distributed (or repartitioned) joins are most difficult ones, because they require such extra processing. In general, database system developers spend a lot of time optimizing join performance since this is a very common and costly operation. Typically, joins computed within a database system will involve far fewer reads and writes to disk, hence, for performance reasons, the current subject matter's system 100 is configured to compute joins completely inside the database engine deployed on each node 102.

In some embodiments of the current subject matter, for a join to be performed completely inside the database engine, the join can be local in the sense that each node 102 joins data from tables stored locally without transporting any data over the network. Otherwise, if data is to be transported across the network, the join might not be done inside the database engines. A local join can be possible if two tables are hash partitioned on the join attribute (e.g., both an employee and department tables are partitioned on a department id attribute). If so, the single-node database system on each node 102 can compute the join on their partitions of the data without having to worry about joining their partition with partitions stored on other nodes 102 in the cluster 105. In general, local joins can be preferable to more general joins (where data is repartitioned over network based on a join key) since local joins have smaller cost and improved performance of the join.

In order to push as many joins as possible into the single node databases, "aggressive" hash-partitioning is performed (where hash-partitioning is performed based on a value of a hash function that determines membership in a partition; assuming there are four partitions, the hash function could return a value from 0 to 3). When a table is hash-partitioned across multiple nodes, an attribute within the table can be used as the partitioning attribute. However, this limits the degree of co-partitioning when tables are related to each other via many steps of foreign-key/primary-key references. For example, in TPC-H (a Transaction Processing Performance Council ("TPC") standard that defines transaction processing and database benchmarks), a line-item table contains a foreign-key to an order table (via an order key attribute), and the order table contains a foreign-key to a customer table (via a customer key ("custkey") attribute). If the line-item table could be partitioned based on the customer who made the order, then any of the straightforward join combinations of the customer, order, and line-item tables would be local to each node. However, the line-item table does not contain the custkey attribute, making direct partitioning impossible. In this case, referential partitioning is beneficial in that it is configured to execute a join operation with a parent table to retrieve its foreign key during loading of the data.

Figure 11:
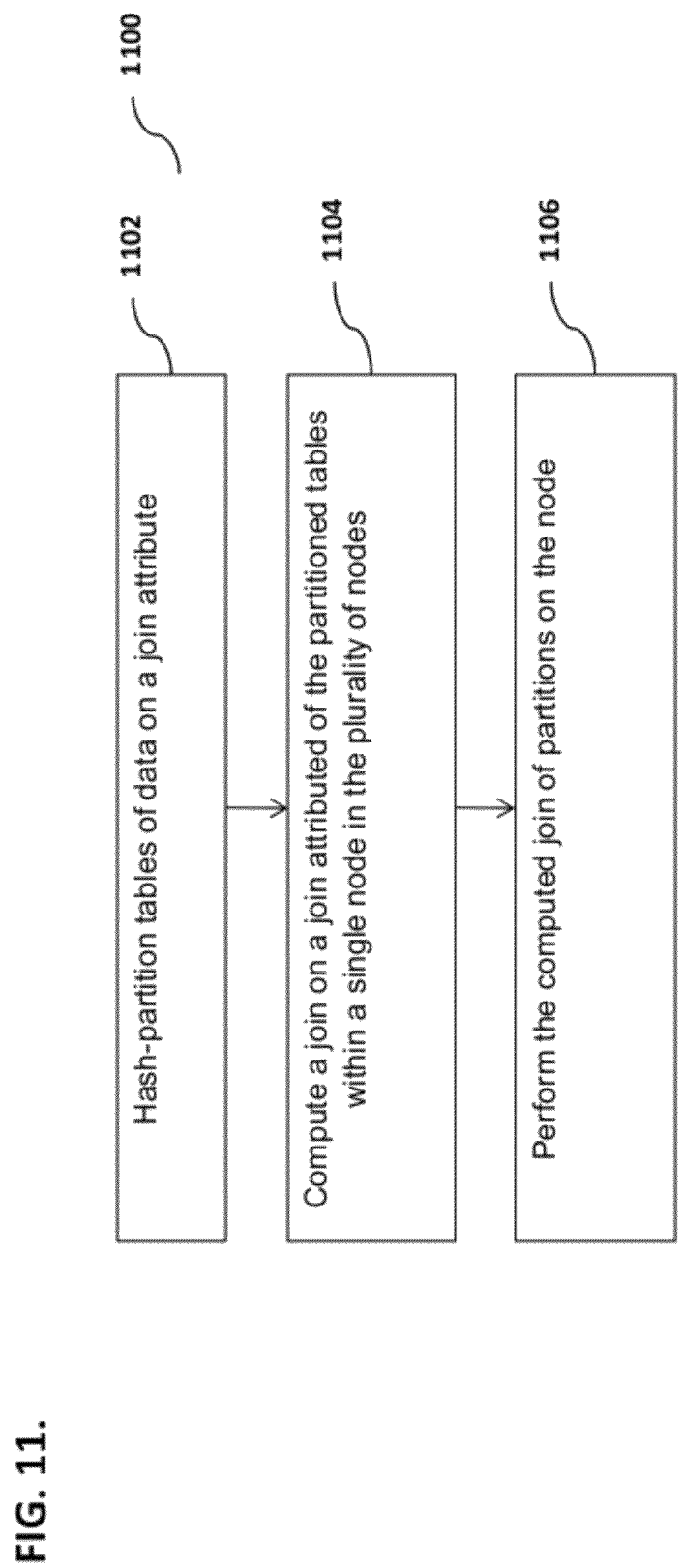
FIG. 11 is a flow chart illustrating an exemplary method, according to some embodiments of the current subject matter.

FIG. 11 is a flowchart illustrating an exemplary method 1100 for processing data that performs a join of various data elements in a database system containing a plurality of nodes, according to some embodiments of the current subject matter. In some embodiments, the data may be stored in tables containing various data attributes (e.g., "custkey" attribute). The method 1100 can be configured to join various partitions of tables on single nodes, i.e., performing local join operation. The method 1100 begins with hash-partitioning tables on a join attribute, which can be predetermined beforehand (at 1102). Then, a join is computed on a join attribute of the partitioned tables within a single node in the plurality of nodes (at 1104). Then, the join of partitions is performed on that node (at 1106). This optimization technique can allow utilization of various references between tables stored in the database system to co-partition related records in such tables. It can further allow computation of joins independently inside databases.

In some embodiments, another join optimization technique is a side-join. One of the uses of the side-join technique is when table collocation is not possible.

Conventional systems implementing MapReduce framework generally perform joins inside the Reduce phase of a MapReduce job. In this case, the Map phase reads each table partition (stored on a particular node) and outputs the join attribute of each tuple as the key and the rest of the tuple as the value. The MapReduce framework then automatically reparations this output across Reduce tasks such that all tuples with the same join key end up being processed by the same Reduce task. For natural joins and equi-joins, no further network communications is necessary—the Reduce tasks simply perform the join on their partition of the data. This algorithm requires that both tables being joined are repartitioned across nodes. However, there are a variety of cases where it is unnecessary to repartition both tables, and commercial parallel database implementations take advantage of these cases whenever possible. First, if one of the tables is already partitioned by the join key, then only the other table has to be repartitioned using the same partitioning function on the join key that the first table used. After this second table has been repartitioned, the join can proceed locally on each node. Second, if one table is much larger than the other, then even if it is not already partitioned by the join attribute, it can be a good idea to leave it in its original location and simply ship the entire small table to every node in the network. Each partition of the larger table can then be joined with the smaller table on each local node.

In both cases where one of the tables is not repartitioned, the current subject matter's system 100 can be configured to perform a join during an initial processing stage, i.e., task-distribution phase of the query execution plan (e.g., in case of a MapReduce job, such join can be performed during the Map phase of a MapReduce job), so that the join can be performed as the stationary table is read off of disk.

Figure 12:
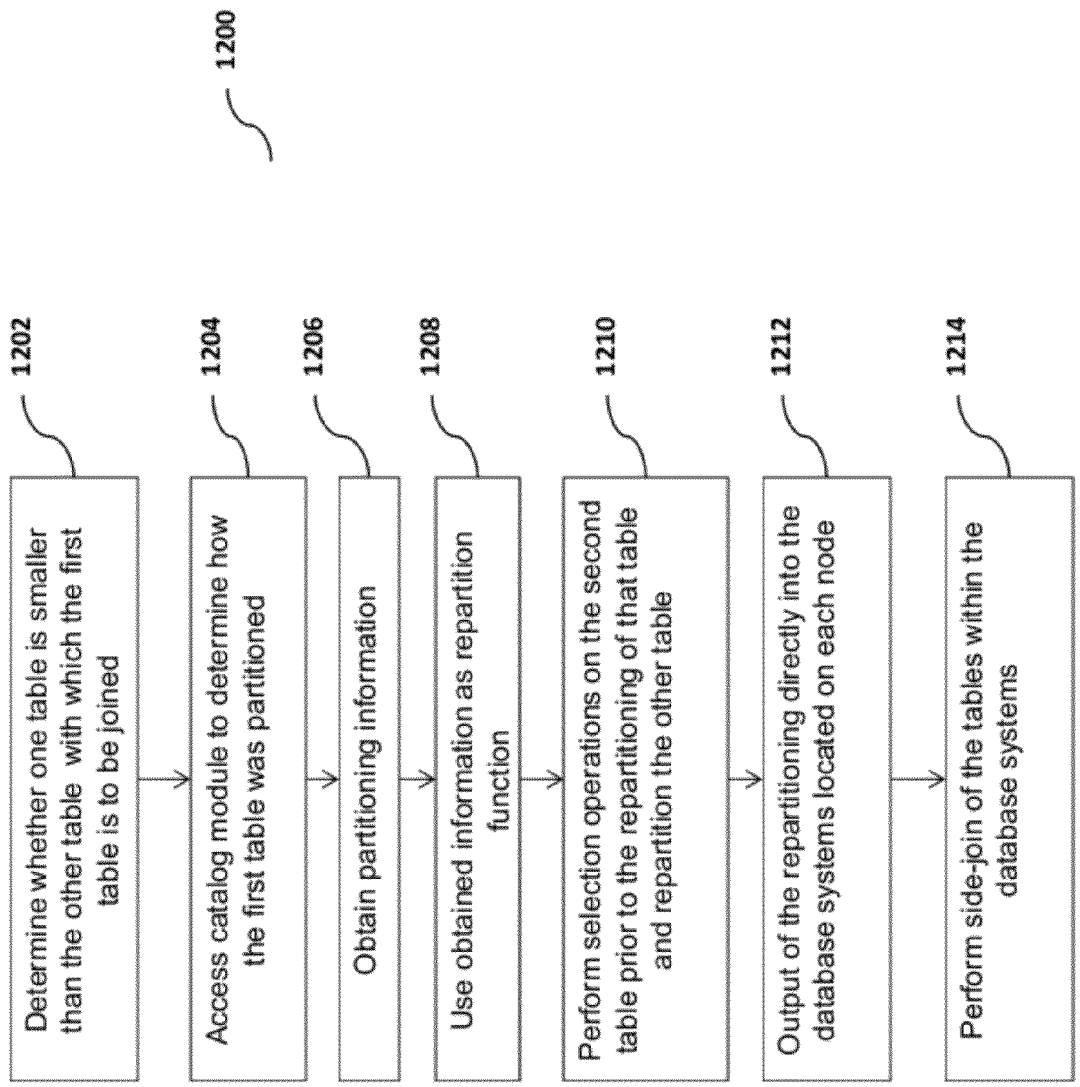
FIG. 12 is a flow chart illustrating another exemplary method, according to some embodiments of the current subject matter.

FIG. 12 is a flow chart illustrating an exemplary method 1200 for processing data, according to some embodiments of the current subject matter. In some embodiments, in the event where one table (e.g., a smaller table) can be already partitioned on the join attribute and the other table (e.g., a larger table) can be repartitioned on that same attribute, the method 1200 can be configured to repartition the second table. As shown at 1202, the system 100 can initially determine whether one table (e.g., a first table) is smaller than the other table (e.g., a second table) with which the first table is to be joined. At 1204, the catalog module can be accessed to determine how the first table was partitioned. At 1206, the obtained partitioning information or function can be used as a repartition function (at 1208). In some embodiments, any selection operations on the second table can be performed prior to the repartitioning of that table (at 1210). Once the repartitioning is complete (at 1210), the system 100 can be configured to write an output of this repartitioning directly into the database systems located on each node (at 1212). The system 100 can include an output format module that is configured to prepare resulting date for output. Once both tables are partitioned on the same attribute, the side-join of the tables can be performed by entirely within the database systems (at 1214).

In some embodiments, when one table is smaller than the other table, the smaller table is broadcast to all nodes 102 in order to avoid repartitioning of the bigger table. The smaller table is read into memory and then stored in a hash table or other temporary memory. Then, partition of the large table is read and sequentially compared to the hash table (this is similar to a standard hash-join). Since each local partition of a table is divided into many chunks, and each chunk can be processed differently or using different tasks. Thus, the smaller table is appropriately joined with the larger table at the nodes 102 using partitioning attributes.

In some embodiments, if a MapReduce framework is implemented, the system 100 can be configured to perform joins during Map phases of the MapReduce tasks, wherein such joins can be referred to as map-side joins. As can be understood by one skilled in the art, other data processing frameworks can be used to perform joins discussed above.

Another query execution strategy can be to perform a side split semi-join, which involves splitting execution of a join into various phases of the query task or splitting the execution between different tasks (e.g., when using a MapReduce framework, execution of the side split semi-join can be split between two separate Map phases of two MapReduce jobs). In this embodiment, initially, the system 100 can be configured to perform any column selections operations on a particular table as well as determine (project) a join attribute for that table. Once a column is selected, it can be repartitioned using the side-join technique discussed above. If the projected column is very small (for example, the key from a dictionary table or a table after applying a very selective predicate), the side-join is replaced with a selection predicate (e.g., using an SQL clause 'foreignKey IN (listOfValues)') and pushed into the DBMS. This allows the join to be performed completely inside the database system without first loading the data into a temporary table inside the DBMS.

The side split semi-join is useful when there is a need to project other attributes from tables (e.g., dictionary tables). This typically occurs at the very end of the query plan, right before outputting the results. The integer identifiers that were carried through the query execution, are replaced by actual text values (for example, the names of the nations).

In some embodiments, the current subject matter's system implements a post-join aggregation as another technique for optimizing query execution. In this embodiment, the current subject matter is configured to push aggregation operations (in cases when they do not conflict with a join) into the database engine. Conventional systems do not appear to have a standard way to perform post-join aggregation. Aggregation can be typically performed when the repartitioning is performed using a partitioning key that is the same as the data-grouping key (a group-by attribute), i.e., the key which is used to group the table data. If, however, the partitioning was done on a join key, in order to join partitions from two different tables, then a new partitioning can be performed to perform the aggregation since, in general, the group-by attribute is different than the join keys. The new partitioning can require additional processing tasks to be performed, thereby causing associated overhead.

Figure 5:
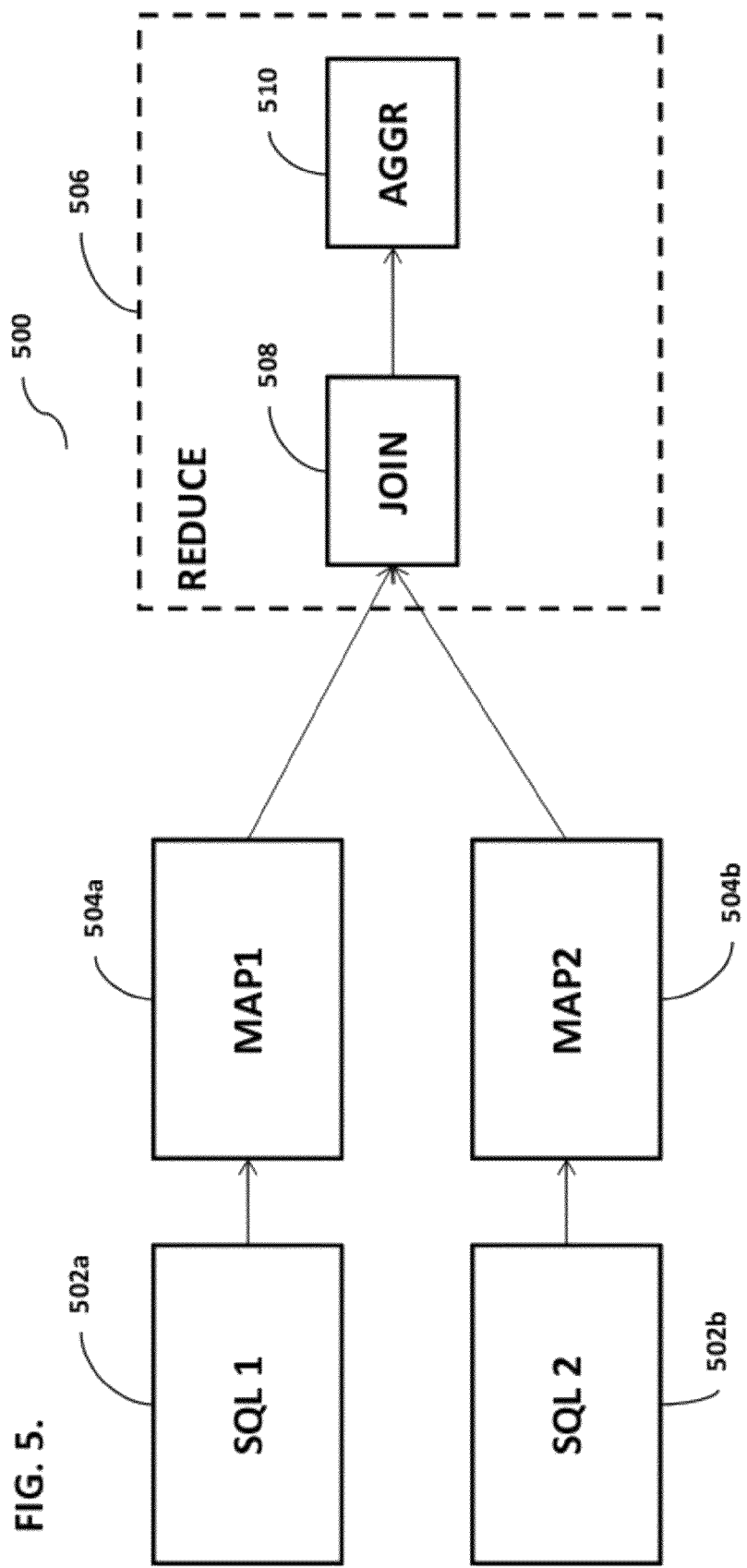
FIG. 5 is a flow chart illustrating an exemplary post-join aggregation, according to according to some embodiments of the current subject matter.

To resolve this problem, the current subject matter performs a hash-based partial aggregation (if the MapReduce framework is implemented, such partial aggregation is performed at the end of the Reduce phase task). Then, a group-by attribute can be extracted and used to probe the stored hash table in order to find the appropriate running aggregation that the obtained result should contribute to (i.e., finding data stored in the hash table that can be used to join with the obtained result). In embodiments using MapReduce framework, this can save significant I/O processing time, since the output of Reduce tasks are written redundantly into HDFS (as opposed to the output of Map tasks which are only written locally to the node that ran the Map task). Hence, by outputting partially aggregated data instead of raw values, much less data must be written to HDFS. FIG. 5 illustrates an exemplary post-join aggregation operation 500, according to some implementations of the current subject matter. Queries (e.g., SQL queries) 502(a, b) can be received and processed during a Map phase ("Map1" 504a, and "Map2" 504b, respectively). Then, the processing of queries proceeds to a Reduce phase 506. During the Reduce phase 506, the queries can be joined using a join operation 508 and then aggregated using an aggregation procedure 510.

Figure 6:
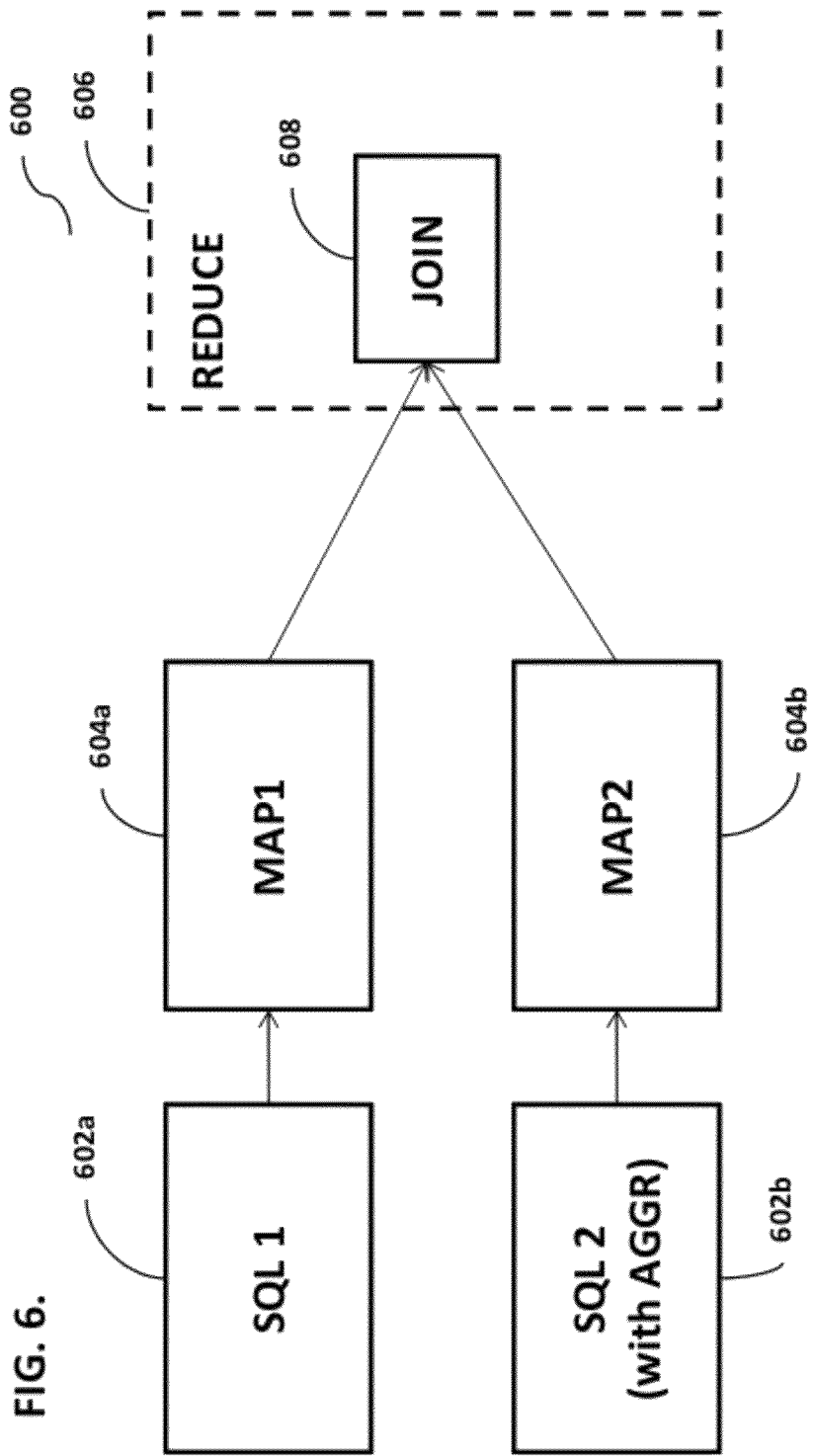
FIG. 6 is a flow chart illustrating an exemplary pre-join aggregation, according to some embodiments of the current subject matter.

In some embodiments, the current subject matter is configured to perform pre-join aggregation techniques can be used to optimize query execution. In these embodiments, aggregations that can be performed after a join in most database systems, are transformed into partial aggregation operators and computed before a join. This is happens when the join cannot be pushed into the database system (for example, via collocated joins or the side-joins). When the product of the cardinalities of the group-by and join-key columns is smaller than the cardinality of the entire table, it becomes beneficial to push the aggregation past the join so that it can be performed inside the faster database systems. Obviously, some of those aggregates might be later dropped because they do not join with the records of the other table but this might be an acceptable trade-off in order to save I/O and network traffic. FIG. 6 illustrates an exemplary pre-join aggregation procedure 600, according to some implementations of the current subject matter. During the Map phase ("Map1" 604a and "Map2" 604b), queries 602a and 602b are received (e.g., SQL queries), where query 602b includes an aggregate function. Inclusion of an aggregate function in the SQL query 602b can indicates that aggregation of queries is to occur prior to the Reduce phase 508 and prior to the join 610 that occurs during the Reduce phase 508.

In some embodiments, the current subject matter can be used in connection with processing of queries of data that can be stored in a data store using graph data model. As discussed below and shown in FIG. 13, data stored using graph data model can be organized according to various "relationships" between data stored in vertexes of a graph. The vertexes can contain a "subject" and/or an "object" (e.g., a portion of data) and the "relationship" can be identified as a predicate (e.g., an object relates to a subject using some function, dependency, relationship, and/or any other manner or combination thereof). A triple <subject, predicate, object> can describe an edge in the graph data model, where the predicate can serve as a label identifying the triple. In some embodiments, it is possible to create a triple for every edge in the graph data model by indicating the name of the edge (i.e., predicate) and its two endpoints (i.e., object and subject). For example, in a social networks setting, triples can be identified as <John Smith, follows, Jane Jones>. Some examples of the graph data model can include resource description framework ("RDF") data. For illustrative, non-limiting purposes only, the following description will periodically refer to processing of queries on RDF data or using an RDF-store, however, as can be understood, the current subject matter is not limited to RDF data or RDF-stores and the current subject matter is applicable to processing of any queries on any data models, including graph data models, directed graph data, and/or any other data models, and/or combination thereof. Some examples of the queries that can be performed using the current subject matter systems, methods, and/or devices, include for example, various SPARQL queries and/or any other queries.

Some embodiments of the current subject matter relate to a data management system (e.g., a scalable RDF data management system or any other data management system) that can be implemented in the system shown and described in connection with FIG. 1 above. For illustrative, non-limiting purposes only, the following description will periodically refer to RDF data management system and use SPARQL queries as exemplary queries performed on RDF data. The RDF management system can be configured to include and/or leverage a single node RDF-store, partition data across nodes to accelerate query processing through locality optimizations, and decompose queries into high performance fragments taking advantage of how data is partitioned in a cluster. The current subject matter is applicable to various types of data, various sizes of data sets (from smaller data sets to largest data sets), various-complexity tasks that can be performed on the data, and/or various query execution techniques.

The resource description framework is a data model that was proposed by the W3C as a standard for representing metadata about Web resources and is a popular data model for releasing public data sets on the Internet. RDF includes a schema-free model making it a flexible mechanism for describing entities in a way that many different data publishers located across the Internet can add arbitrary information about the same entity and/or create links between disparate entities. RDF uses a graph data model, where different entities are vertexes in the graph and relationships between them are represented as edges. Information about an entity is represented by directed edges emanating from the vertex for that entity, which are labeled by the name of the attribute. The edge connects the vertex to other entities or to special "literal" vertexes that contain the value of a particular attribute for that entity.

Figure 13:
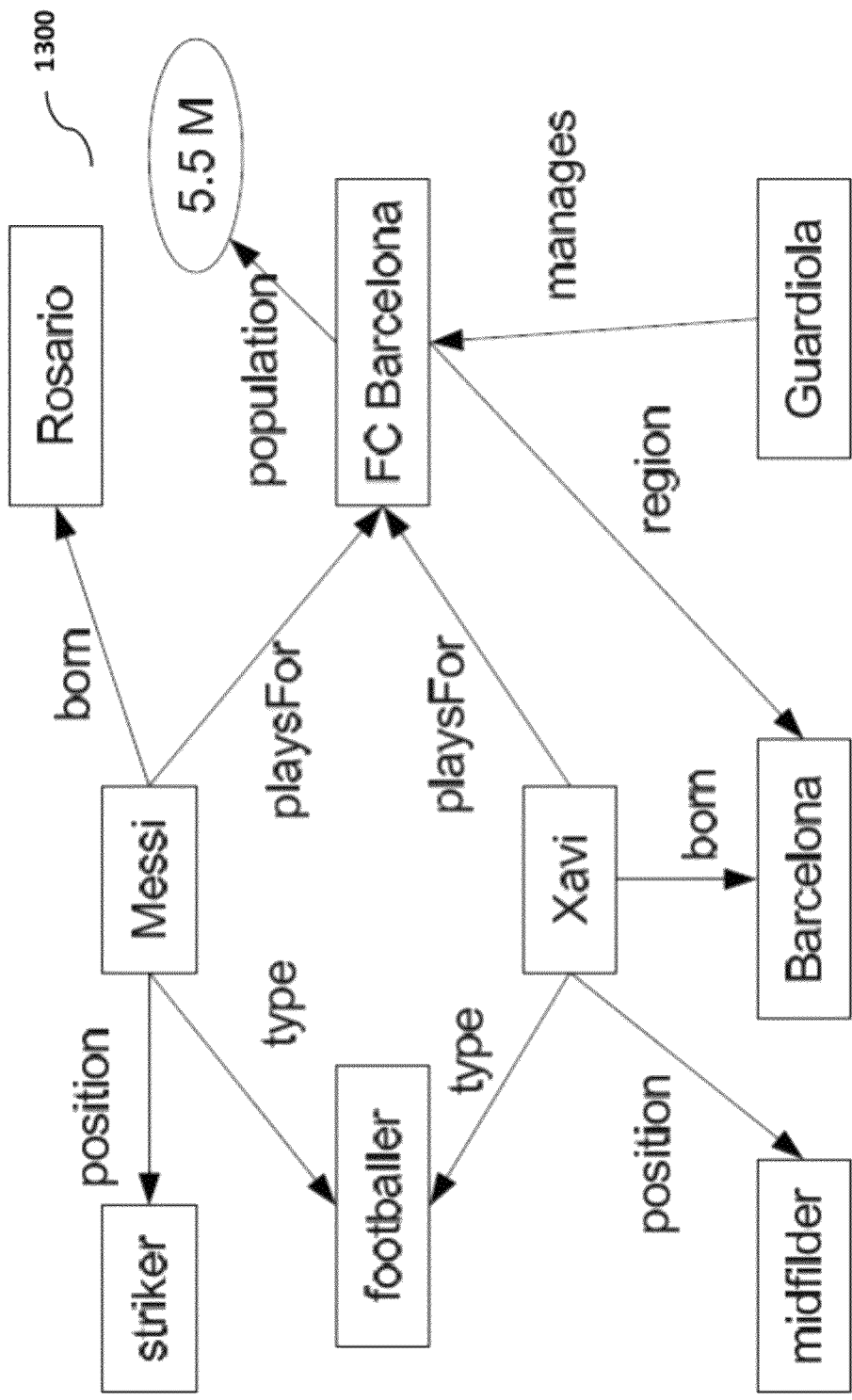
FIG. 13 illustrates an exemplary graph data model, according to some embodiments of the current subject matter.

FIG. 13 illustrates an exemplary graph 1300. The graph includes a plurality of entities that are represented by rectangles (e.g., "Messi", "Xavi", etc.) and edges are represented by arrows (e.g., "position", "born", etc.). For example, edges in the graph indicate that the entity "Messi" is of type (edge "type") "footballer", was born (edge "born") in Rosario, and plays striker (edge "position") for (edge "playsFor") FC Barcelona. Each of the entities that the entity "Messi" is connected to in this graph can have their own set of connections. For example, FC Barcelona is shown to be connected to the Barcelona entity through the region (edge "region") relationship.

To store and query data, data stores can be used. The data stores represent data/graphs as a table of triples, where there is one triple for each edge in the data graph. The triple takes the form <subject, predicate, object>, where the subject is the entity from which the directed edge emanated, the predicate is the label of the edge, and the object is the name of the entity or literal on the other side of the edge. The data stores can store the triples in a relational database using a single relational table containing three columns. The triple table for the exemplary data graph shown in FIG. 13 is presented in Table 1 below.

TABLE 1

| Subject | Predicate | Object |
|---|---|---|
| Lionel Messi | Type | footballer |
| Lionel Messi | playsFor | FC Barcelona |
| Lionel Messi | Born | Rosario |
| Lionel Messi | Position | Striker |
| Xavi | Type | Footballer |
| Xavi | playsFor | FC Barcelona |
| Xavi | Born | Barcelona |
| Xavi | Position | Midfielder |
| FC Barcelona | Region | Barcelona |
| Barcelona, Spain | Population | 5,500,000 |
| Josep Guardiola | Manages | FC Barcelona |

An exemplary data store can include <Lionel Messi, playsFor, FC Barcelona>. This corresponds to entity "Messi" in FIG. 13, edge "playsFor" and entity "FC Barcelona".

A SPARQL query is an exemplary query that can be used to perform querying of data (e.g., RDF data or any other data) using some embodiments of current subject matter. As stated above, any other queries can be used to query any data using current subject matter. Official W3C Recommendation documentation provides the following description of a SPARQL query: "Most forms of SPARQL queries contain a set of triple patterns called a basic graph pattern. Triple patterns are like RDF triples except that each of the subject, predicate and object may be a variable. A basic graph pattern matches a subgraph of the RDF data when RDF terms from that subgraph may be substituted for the variables." (See, "SPARQL Query Language for RDF", W3C Working Draft 4 Oct. 2006, http://www.w3.org/TR/rdf-sparql-query/, 2006).

Execution of queries can involve graph pattern matching. For example, the query in FIG. 14 returns managers of all football/soccer clubs in Barcelona. This example tries to find entities in the data set that have at least two edges emanating from them: one that is labeled "type" and connects to the "footballClub" entity, and one that is labeled "region" and connects to the "Barcelona" entity. Entities that match this pattern are referred to using the variable name "?club" (the "?" character is used to indicate pattern variables). For these entities, edges that connect to them via the "manages" label can be determined and both sides of that edge if such an edge exists can be returned.

If the data is stored using a relational "triples" table, queries can be converted to SQL (or any other programming environment and/or language) in a fairly straightforward way, where the triples table can be self-joined for each condition in the query, using shared variable names as the join equality predicate. For example, the query above can be converted to the following SQL:

```
SELECT    A.subject, A.object
FROM      triples AS A, triples AS B, triples AS C
WHERE     B.predicate = "type"       AND B.object = "footballClub"
AND       B.subject = C.subject      AND C.predicate = "region"
AND       C.object = "Barcelona"     AND C.subject = A.object
AND       A.predicate = "manages"
```

Figure 15:
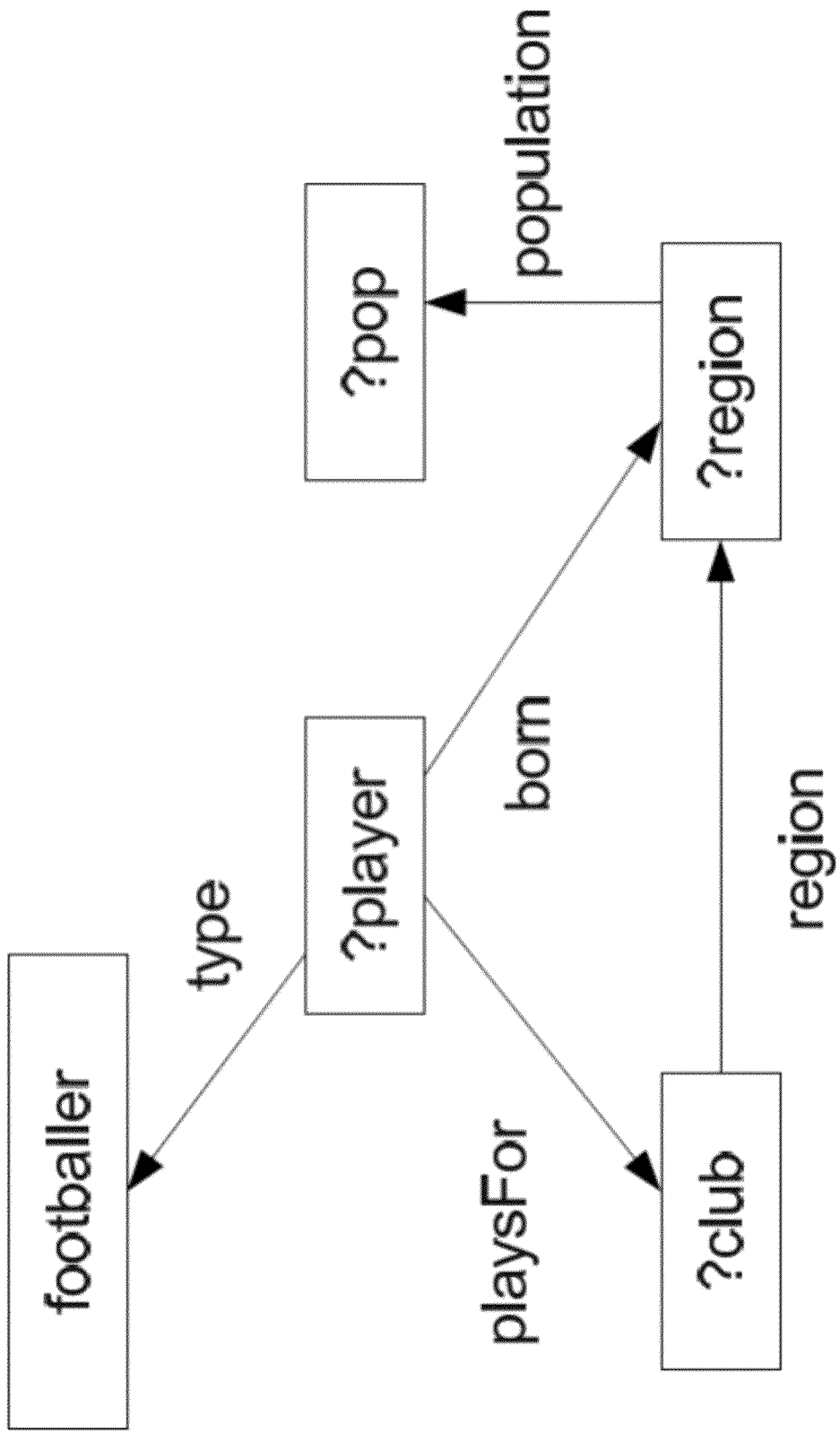
FIG. 15 illustrates another exemplary graph data model, according to some embodiments of the current subject matter.

The following query illustrated below represents a more complicated query that attempts to find football player(s) playing for clubs in a populous region (e.g., population of at least 2 million) that also happens to be the region where a football player was born. For example, such player might have significant advertising value as a product spokesman in that region. The graph version of the above query is illustrated in FIG. 15.

```
SELECT ?player ?club ?region
    WHERE {        ?player type              footballer.
                   ?player playsFor          ?club.
                   ?player born              ?region.
                   ?club region              ?region.
                   ?region population        ?pop.
                   FILTER (?pop > 2,000,000) }
```

In general, graph patterns that involve paths through the data graph can convert to subject-object joins in the SQL (or any other programming language or environment), and patterns that involve multiple attributes about the same entity can involve subject-subject joins in the SQL (the above example has both types of joins). Although other types of joins are possible, subject-subject and subject-object joins may be more common.

Figure 16:
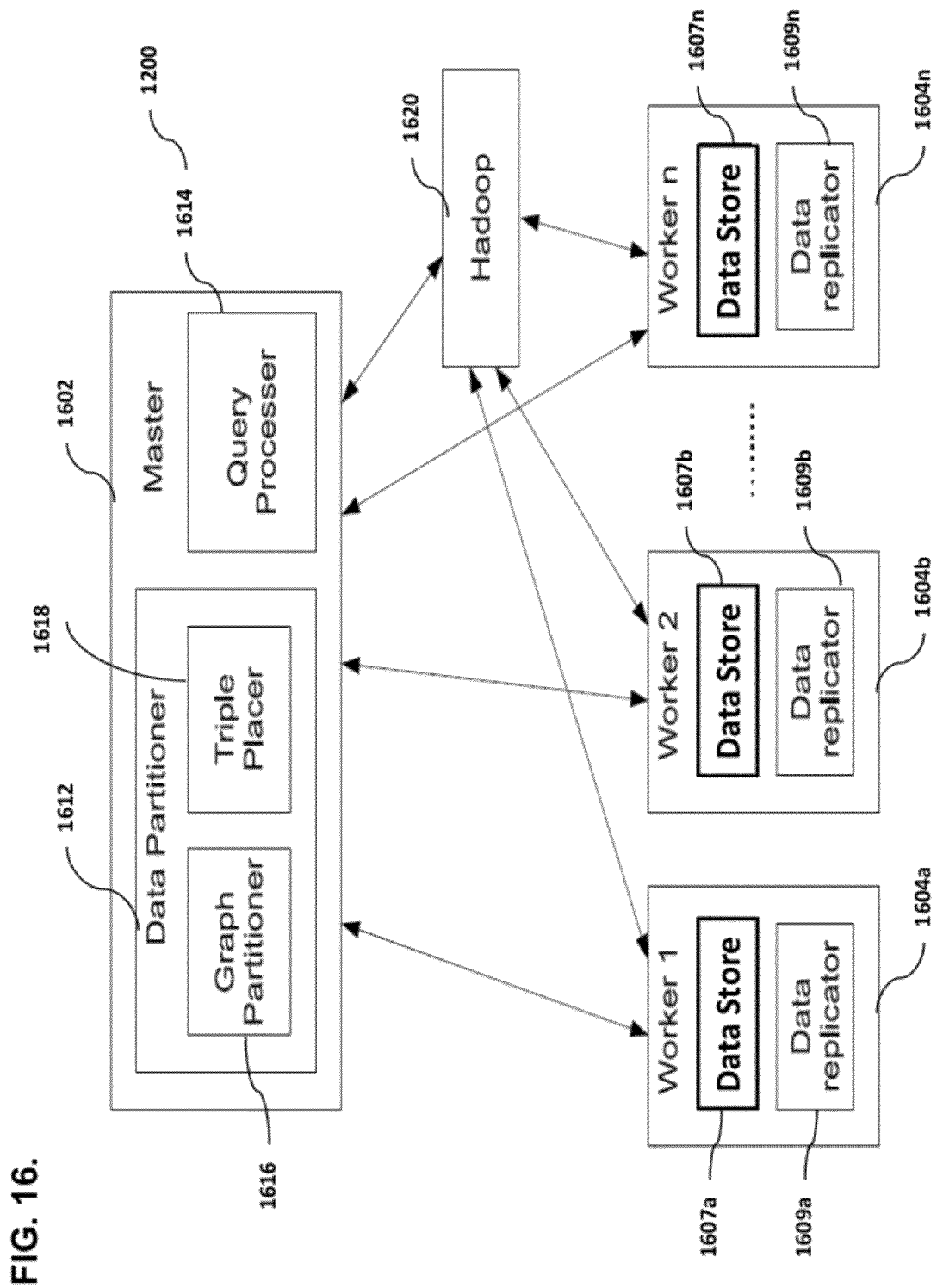
FIG. 16 illustrates exemplary system for processing queries, according to some embodiments of the current subject matter.

FIG. 16 illustrates an exemplary system 1600 for processing queries, according to some embodiments of the current subject matter. The system 1600 is similar to the system shown in FIG. 1. It can include a master node 1602 and a plurality of worker/slave nodes 1604 (a, b, . . . , n). The master node 1602 can include a query processor module 1614 and a data partitioner module 1612. The data partitioner 1612 can include a graph partitioner module 116 and a triple placer module 1618. In some embodiments, the system 1600 can also include a processing layer 1620 and the master node 1602 can be configured to assign tasks to worker nodes 1604 and receive results through such layer. As shown in FIG. 16, such layer can include a Hadoop query processing layer (or any other processing layer), as discussed above. In some embodiments, the master node 1602 can be configured to communicate with worker nodes 1604 directly. Each worker node 1604 can include a data store module (e.g., an RDF-store module or any other data store module) 1607 and a data replicator module 1609. Each node (1602, 1604) can be represented by a computing system that can include at least one memory and at least one processor coupled to the memory.

Triples can be loaded into the system 1600 and fed into the data partitioner module 1612 which can perform a disjoint partitioning of the graph by vertex. The output of an algorithm performed by the data partitioner module 1612 can be used to assign triples to worker nodes 1604 according to the triple placement algorithm performed by the triple placer module 1618, which is described below. Each worker node can include an installation of a pluggable store module 1607 and can load all triples it receives from the triple placer module 1618.

In order to increase the number of queries that can be run in parallel, some triples can be replicated on multiple nodes. The data replicator module 1609 on each worker node 1604 can determine which triples are on the boundary of its partition and can replicate these triples according to an n-hop guarantee using a Hadoop job after each new batch of triples are loaded. An n-hop guarantee can be directed n-hop guarantee or a an undirected n-hop guarantee, which can be defined as follows:

Directed n-hop guarantee:
Let G={V, E} be a graph, where V refers to vertexes and E refers to edges in the graph; and W ⊂ V. $P_n$, the directed n-hop guarantee for W, $P_n \subset G$ is defined recursively as follows:
(1) $P_0 = \{V_0, E_0\}$ where $V_0 = W$ and $E_0 = 0$ is the directed 0-hop guarantee for W.
(2) If $P_n = \{V_n, E_n\}$ is the directed n-hop guarantee for W, then $P_{n+1} = \{V_{n+1}, E_{n+1}\}$ is the directed (n+1)-hop guarantee for W where $$V_{n+1} = \{v | (v',v) \in E, v' \in V_n\} \cup V_n,$$

$$E_{n+1} = \{(v,v') | (v,v') \in E, v \in V_n, v' \in V_{n+1}\} \cup E_n.$$

Undirected n-hop guarantee:
Let G={V, E} be a graph, where V refers to vertexes and E refers to edges in the graph; and W ⊂ V. $P_n$, the undirected n-hop guarantee for W, $P_n \subset G$ is defined recursively as follows:
(1) $P_0 = \{V_0, E_0\}$ where $V_0 = W$ and $E_0 = 0$ is the directed 0-hop guarantee for W (0-hop guarantee contains no edges and no triples).
(2) If $P_2 = \{V_n, E_n\}$ is the undirected n-hop guarantee for W, then $P_{n+1} = \{V_{n+1}, E_{n+1}\}$ is the undirected (n+1)-hop guarantee for W where $$V_{n+1} = \{v | (v,v') \in E \text{ or } (v',v) \in E, v' \in V_n\} \cup V_n,$$

$$E_{n+1} = \{(v,v') | (v,v') \in E, v \in V_n, v' \in V_{n+1}\} \cup \{(v',v) | (v', v) \in E, v \in V_n, v' \in V_{n+1}\} \cup E_n.$$

The master node 1602 can serve as the interface for queries. It can accept queries and analyze them accordingly. If it determines that the query pattern can be searched completely in parallel by each worker node 1604 in the cluster, it can send the query pattern to each node 1604 in the cluster for processing. If it determines that the query pattern requires some coordination across worker nodes 1604 during the search, the master node 1602 can decompose the query into sub-graphs that can be searched in isolation and can transmit these sub-graphs to the worker nodes 1604 for processing. Then, the master node 1602 can hand off the rest of the query, including the query processing needed to reconstruct the original query graph, to Hadoop layer for completion.

When data is partitioned across multiple machines, a particular partitioning algorithm can make a difference in the amount of data that may need to be shipped over the network at query time. The following example illustrates a query that returns names of the strikers that have played for FC Barcelona:

```
SELECT ?name
WHERE {      ?player type         footballPlayer.
             ?player name         ?name.
             ?player position     striker.
             ?player playsFor     FC_Barcelona. }
```

If data was partitioned using a simple hash partitioning algorithm, it can be performed in parallel without any network communication. If data was hash-partitioned by subject, then it can be guaranteed that all triples related to a particular player can be stored on the same node 1604. Thus, each node 1604 in the cluster can process a query completely in parallel for the subset of players that had been hash-partitioned to that node 1604 and the results can be aggregated together across nodes 1604 at the end of the query.

In some embodiments, data can be graph partitioned instead of hash partitioned across nodes and some vertexes that are close together in the graph can be stored on the same node (unless they are near a partition boundary). Further, graph patterns that contain paths through the graph of length two or above can be performed in parallel as long as some correction is taken for graph subsets on the partition boundaries that could span multiple nodes. Since a triple is describing a particular edge in the graph, i.e., the number of triples in a data set is equal to the number of edges in a graph, graph partitioning can be performed using "edge-partitioning" of the graph into disjoint subsets. In some embodiments, the graph can be portioned by vertex, such that each machine in a cluster receives a disjoint subset of vertexes that are close to each other in the graph. Once the graph has been partitioned, triples can be assigned to nodes for processing. Each triple can be placed on the node that contains the subject vertex for that triple.

In some embodiments, graph partitioning can include dividing vertexes of a graph into disjoint partitions (also referred to as vertex partitioning) and assigning triples to partitions based on the original graph, the output of vertex partitioning, as well as other parameters (also referred to as triple placement). In the vertex partitioning involving RDF graphs, triples, whose predicate is rdf:type (and other similar predicates with meaning "type"), can be removed to avoid generating undesirable connections, whereby every entity of the same type would be within two hops of each other in the RDF graph (connected to each other through the shared type object). These connections make the graph more complex and reduce the quality of graph partitioning significantly, since the more connected the graph is, the harder it is to partition it. After partitioning the vertexes of the graph into disjoint partitions, triples from the data set can be assigned into these partitions. To do so, the subject for each triple can be checked and the triple in the partition that contains the vertex corresponding to that subject can be placed. In some embodiments, to improve performance of the system in triple placement, Hadoop query execution layer can be used. As stated above, Hadoop layer can perform coordination of query processing across nodes and ensure processing of queries substantially completely in parallel without any coordination and queries that require even a small amount of coordination. An exemplary triple placement algorithm that can be used in connection with a MapReduce technique (discussed above) is illustrated in FIG. 17*d*.

For triple replication, an n-hop guarantee can be defined as follows. For a subgraph assigned to a partition, a 1-hop guarantee can calculate all vertexes in the complete graph that are connected via a single (undirected) edge to any vertex already located within the subgraph, and can add this set of vertexes along with their associated edges to the subgraph. A 2-hop guarantee can start with the subgraph that was created by the 1-hop guarantee and add another layer of vertexes and edges connected to this new subgraph. This works recursively for any number of hops, as illustrated above. The triples corresponding to the edges added by the n-hop guarantee can be replicated to that partition.

In order to avoid returning duplicate results due to the replication of triples across partitions, triples that are owned by a partition can be distinguished, i.e., the subject of these triples can be one of the base vertexes of that partition, and triples that were replicated to that partition can be made to satisfy the n-hop guarantee. This can be done by explicitly storing a list of base vertexes on each node. To unify the format, the list of base vertexes can be stored in a triple format. For each base vertex v in the vertex partition, a triple (v, '<isOwned>', 'Yes') can be added. Note that while the graph model can be directed, the n-hop guarantee can treat graphs as if they were undirected. Thus, triples (s, p, o) and (o, p', o') where the subject of one triple is equal to the object of another triple can be guaranteed to end up in the partition that "owns" vertex o under a 1-hop guarantee. For example, a query in FIG. 14 can be performed completely in parallel if data is partitioned using a 1-hop guarantee. Each partition can perform the subgraph match for the clubs that are owned by that node (i.e., the vertex corresponding to that club is based in that partition), knowing that all information about the manager and city of that club can be found within one (undirected) hop of that club and are therefore stored in the same partition. A query illustrated in FIG. 15 can be performed completely in parallel if data is partitioned using a 2-hop guarantee.

In embodiments involving RDF graphs, to deal with triple patterns involving rdf:type that can appear in queries, for each vertex that is added in the last round of the n-hop guarantee generation, a triple emanating from this vertex containing its rdf:type, if such a triple exists, can be added. This can reduce a need for cross-partition communication. High degree vertexes (i.e., vertexes that are connected to many other vertexes) can cause problems for both a regular graph partitioning scheme (since well connected graphs are harder to partition) and for the n-hop guarantee (since adding these vertexes causes many edges to be dragged along with them). When a graph is well-connected through high-degree vertexes, dropping some of these high-degree vertexes can make the graph become far less connected and easier to partition. Before the graph partitioning, the data can be scanned to find the degree of each vertex (sampling also works) and the average degree for each type (e.g., rdf:type for RDF data) can be calculated. If the average exceeds a threshold (e.g., three standard deviations away from the average degree across all types), vertexes from that type can be excluded from graph partitioning (and therefore all triples whose subject is equal to a vertex from that type are removed). After the partitioning, the dropped vertexes can be added to the partitions based on how which partition contains the most edges to that vertex.

Besides lowering the quality of graph partitioning, high degree vertexes can also cause data explosion during replication of triples to satisfy the n-hop guarantee. During triple placement, these vertexes can bring far more triples into the hop guarantee than other vertexes do. The overlap between partitions grows exponentially when high-degree vertexes are connected to each other but assigned to different partitions. To counter this problem, the hop guarantee can be weakened so that it does not include triples of high-degree types. The query processing algorithm can be made aware that triples of high-degree types are not included in the hop guarantee, and graph patterns involving these types require additional communication across partitions.

Referring back to FIG. 16, the system 1600 can be configured to execute queries in various types of data stores (e.g., RDF-stores) and/or Hadoop. In some exemplary embodiments, since query processing can be more efficient in data stores than in Hadoop, query processing can be pushed into data stores as much as possible with the remainder being handled by Hadoop. As discussed above, data partitioning can have a big impact on query processing. The larger the hop guarantee in the data partitioning algorithm, the less work there is for Hadoop to do (in some cases, Hadoop can be avoided entirely).

If a query can be answered entirely in data stores without data shuffling in Hadoop, such query can be referred to as a parallelizable without communication query ("PWOC query"). FIGS. 17a-c illustrate exemplary algorithms for determining whether a query (e.g., a SPARQL query) is PWOC query given an n-hop guarantee. The algorithm in FIG. 17a assumes that the input query has been converted into an undirected graph. The algorithm uses a "distance of farthest edge" ("DoFE") as a measure of centrality in a graph. The vertex in a graph with the smallest DoFE can be the most central in a graph. Such vertex can be referred to as a "core" in function "IsPWOC", as shown in FIG. 17a. FIG. 17b illustrates an algorithm for deterring whether a query is PWOC with a directed n-hop guarantee. FIG. 17c illustrates an algorithm for determining whether a query is PWC with optimization for high-degree vertexes (i.e., the vertexes that contain a lot of connections).

Since partitions overlap in the triples they own, there can be duplicate results in query processing, which may need to be addressed. One approach to deal with this issue can include use of a Hadoop job to remove duplicates after the query has been completed. Similarly to the discussion of addition of triples (v, '<isOwned>', 'Yes') to a partition, if v was one of the base vertexes assigned to that partition by a disjoint partitioning algorithm, for each query issued to the data stores, an additional pattern (core, '<isOwned>', 'Yes') can be added. The core can be found in the function IsPWOC. This way, each partition can only output the subgraph matches whose binding of the core is owned by the partition.

If a query is not PWOC, the query can be decomposed into PWOC sub-queries. Hadoop jobs can be used to join the results of the PWOC sub-queries. The number of Hadoop jobs required to complete the query can increase as the number of sub-queries increases. Thus, system 1600 can adopt the query decomposition with the minimal number of sub-queries as a heuristic to optimize performance.

Figure 14:
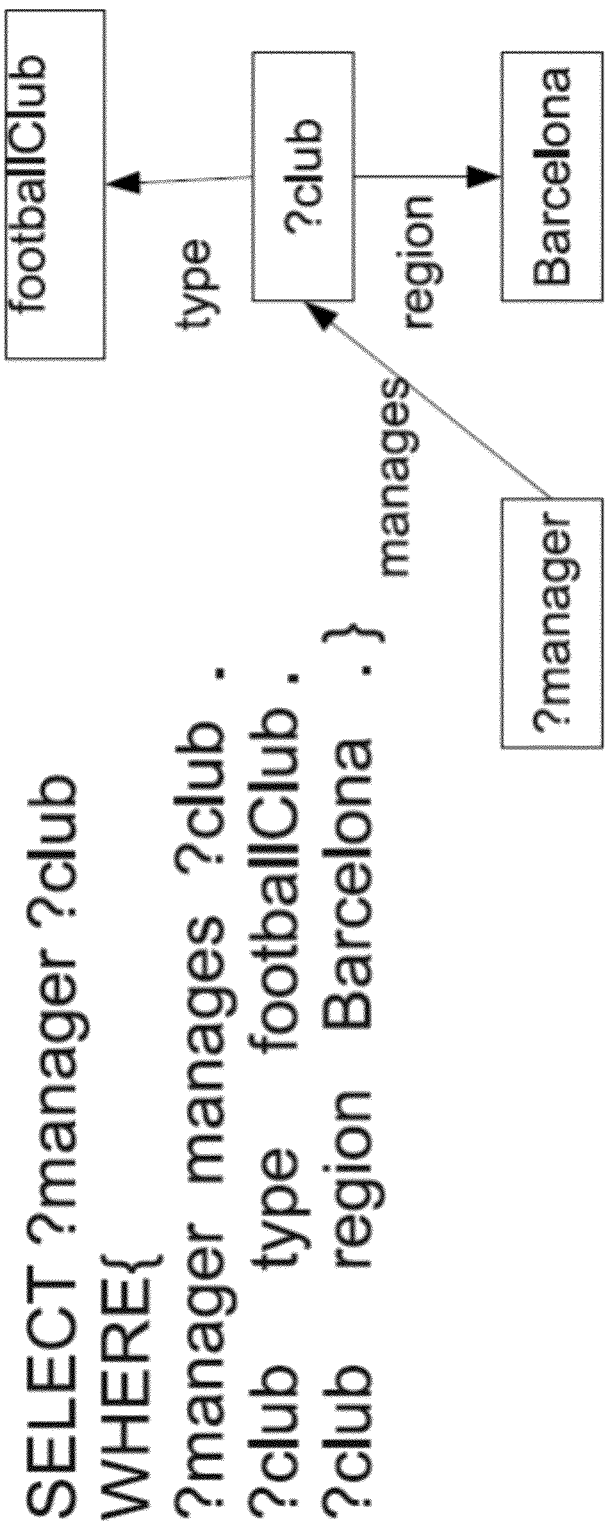
FIG. 14 illustrates an exemplary query, according to some embodiments of the current subject matter.

Referring to FIG. 14, the DoFEs for manager, footballClub, Barcelona and club are 2, 2, 2 and 1, respectively. Club can be chosen as the core because it has the smallest DoFE. For the query illustrated in FIG. 15, the DoFEs for footballer, pop, region, player and club are 3, 3, 2, 2 and 2, respectively. Any of region, player or club can be chosen as the core. If the data partitioning uses a 1-hop guarantee, then the query shown in FIG. 14 can be considered as a PWOC query because the DoFE for club is the same as the hop guarantee. A triple pattern (?club, '<isOwned>', 'Yes') can be added to the query which is then issued to the data stores. In contrast, query illustrated in FIG. 15 is considered as a non-PWOC query and decomposed into PWOC sub-queries, as illustrated below:

```
Subquery 1:
    SELECT ?player ?club ?region
        WHERE {    ?player    type          footballer.
                   ?player    playsFor      ?club.
                   ?player    born          ?region.
                   ?player    isOwned       Yes.}
Subquery 2:
    SELECT ?club ?region
        WHERE {    ?club      region        ?region.
                   ?region    population    ?pop.
                   ?region    isOwned       Yes.
                   FILTER (?pop > 2,000,000) }
```

Player and region can be chosen as cores in the sub-queries because they both have DoFE as 1. After the two sub-queries are executed in the data stores, the intermediate results can be joined on club and region by a Hadoop job. For the 2-hop guarantee, queries shown and discussed in connection with FIGS. 14 and 15 are PWOC queries.

Figure 25:
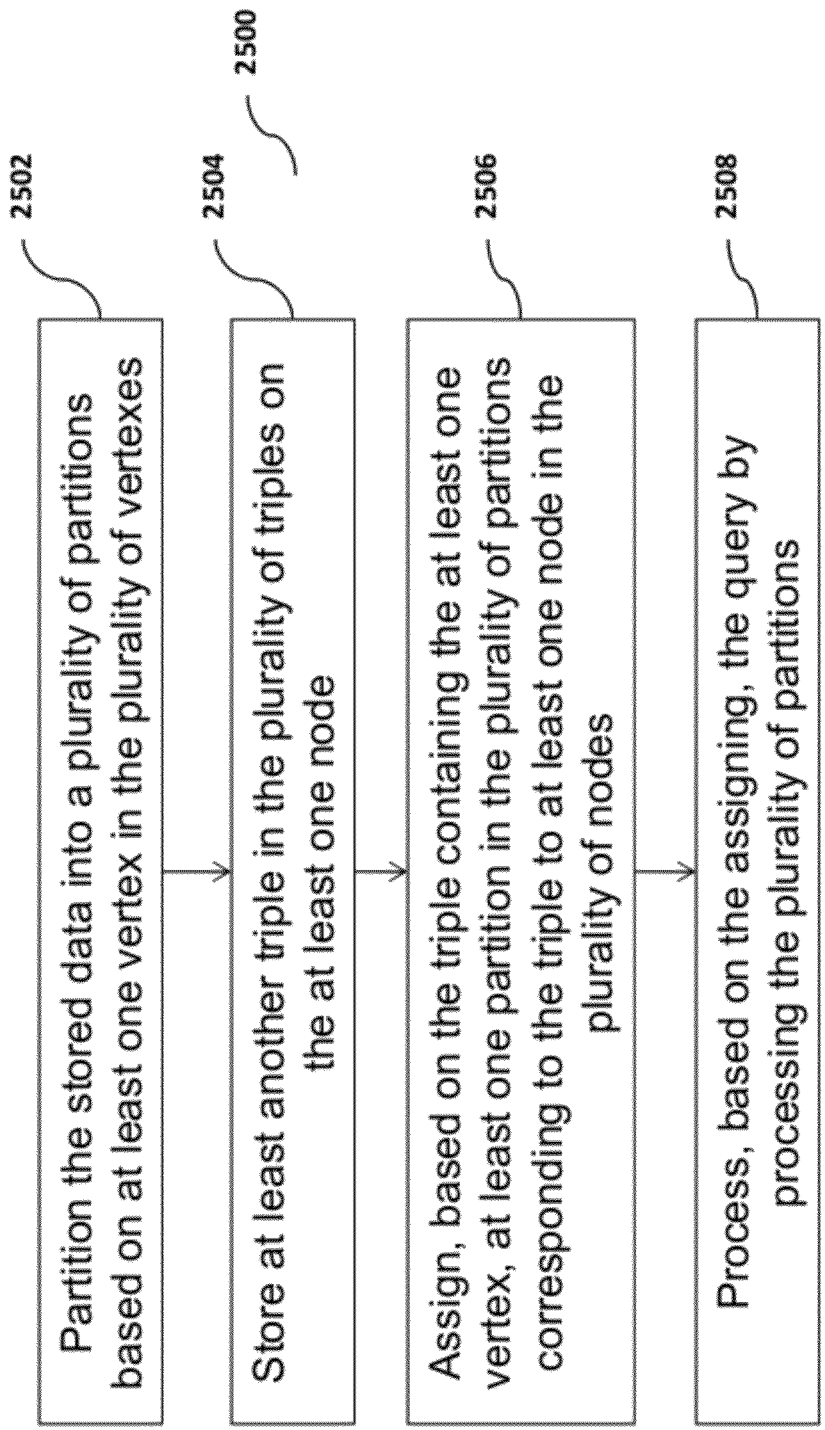
FIG. 25 is a flowchart illustrating a method for processing queries, according to some embodiments of the current subject matter.

FIG. 25 is a flowchart illustrating an exemplary method 2500 for processing a query, having at least one query parameter, of data, according to some embodiments of the current subject matter. The data can be stored on a plurality of nodes in accordance with a graph data model. The graph data model can include a plurality of vertexes configured to be logically connected using a plurality of edges. Each vertex in the plurality of vertexes can be configured to correspond to a portion of data, wherein the portion of data is configured to be stored at a node in the plurality of nodes. At least one vertex in the plurality of vertexes can be configured to be logically connected to at least another vertex in the plurality of vertexes using at least one edge in the plurality of edges. Two vertexes logically connected by an edge can be configured to form a triple in a plurality of triples. At 2502, the stored data can be partitioned into a plurality of partitions based on at least one vertex in the plurality of vertexes. At 2504, at least another triple in the plurality of triples can be stored on at least one node. At 2506, at least one partition in the plurality of partitions corresponding to the triple can be assigned to at least one node in the plurality of nodes based on the triple containing the at least one vertex. At 2508, the query can be processed by processing the plurality of partitions based on the assigning. At least one of the partitioning, the storing, the assigning, and the processing is performed on at least one processor.

In some embodiments, the current subject matter can include the following optional features. The method can further include determining other vertexes logically connected to the at least one vertex, and selectively replicating triples containing the determined vertex to the at least one node for processing. The method can also include determining whether triples already existing in the partition and the replicated triples include duplicative triples, and excluding duplicative triples from the processing.

The graph data model can be a directed graph data model. The graph data model can includes a resource description framework data.

The processing can exclude processing of triples contained within partitions wherein the triples have a predetermined type (e.g., rdf:type).

The method can also include determining whether the at least one vertex is configured to be logically connected to other vertexes contained in the plurality of nodes using a plurality of logical connections, wherein the plurality of logical connections is configured to exceed a predetermined threshold, and excluding, based on the determining, the at least one other vertex having the plurality of logical connections exceeding the predetermined threshold from the partitioning.

The method can be configured to further include determining whether the received query can be processed in parallel on the plurality of nodes, and dividing, based on the determining, the received query into a plurality of sub-queries.

The plurality of partitions can include a plurality of disjoint partitions that can be configured to be disjoint by a core vertex. The triple can be stored in a memory of at least one node in the plurality of nodes. The memory can be a local memory, a disk, a random access memory, a read only memory, an internal storage, an external storage, a repository, a temporary storage, and/or any other storage facility.

At least one query parameter can include at least one of the following: at least one constant parameter and at least one variable parameter. The method can further include determining a sub-graph pattern of the query parameters, wherein two query parameters and a logical connection between the two query parameters are configured to form a query triple in a plurality of query triples, comparing the sub-graph pattern of the query parameters to the graph data model containing the plurality of vertexes by comparing the plurality of triples in the graph data model to the plurality of query triples, and determining, based on the comparing, whether an identical match exists between at least one triple in the plurality of triples in the graph data model and at least one query triple in the plurality of query triples when the query triple includes two constant parameters configured to match two vertexes in the at least one triple in the plurality of triples in the graph data model, and a vertex in the plurality of vertexes in the graph data model to match a variable parameter in a query triple in the plurality of query triples, the query triple including a constant parameter and the variable parameter and the constant parameter is configured to match another vertex in the plurality vertexes. The variable parameter can include at least one of the following: at least one edge in the plurality of edges and at least one vertex in the plurality of vertexes. In some embodiments, a sub-graph query can be configured to include at least one of the following: at least one constant vertex, at least one constant edge, at least one variable vertex, and at least one variable edge, wherein at least one constant vertex and at least one constant edge is configured to match at least one vertex and at least one edge in the graph data mode, respectively.

In some embodiments, a sub-graph pattern matching query can include a graph (vertexes and labeled edges of these vertexes), where vertexes and edge-labels can be constants or variables. A match can occur when, for each edge (i.e. vertex-edge-label-vertex triple) in the query sub-graph, an edge can be found in the original data set that matches the constants exactly, and variables can be consistently bound, which means that if the same variable can be found in different triples in the query sub-graph, then they have to agree on what value they are going to match to, For example:

Data (in Vertex-EdgeLabel-Vertex format):

| A | X | B |
| A | Y | C |
| B | Z | D |

A sub-graph query (in Vertex-EdgeLabel-Vertex format) can include:

| A  | X  | ?1 |
| ?1 | ?2 | D  |

In the sub-graph query, A, X, and D can be constants and have to match exactly. ?1 and ?2 can be variables. This exemplary sub-graph query has a match, i.e., if "B" is substituted for ?1 and Z for ?2, then the first triple in the query sub-graph matches with the first triple in the graph data set, and the second triple in the query sub-graph matches with the third triple in the graph data set.

In some embodiments, the processing can be configured to be performed in parallel using Apache Hadoop.

EXAMPLES

The following discussion illustrates some of the experiments in query execution optimization conducted by the present application's inventors. The discussion includes an outline of experimental benchmark systems setup, data loading procedures, followed by an analysis of results. These examples are provided for illustrative purposes only and are not intended to limit the current subject matter in any way. Example 1 provides an illustration of various query execution techniques performed using system 100 shown in FIGS. 1-12. Example 2 illustrates query execution techniques performed on RDF data using SPARQL queries.

Example 1

A. Experimental Setup

The following is a discussion of three benchmarked systems, including the system 100, which have been used in these examples. All three systems were deployed on a 45-node cluster. Each node had a single 2.40 GHz Intel Core 2 Duo processor running 64-bit Red Hat Enterprise Linux 5 (kernel version 2.6.18) with 4 GB RAM and two 250 GB SATA-I hard disks. According to hdparm, the hard disks deliver 74 MB/sec for buffered reads. All nodes were on the same rack, connected via 1 Gbps network to a Cisco Catalyst 3750E-48TD switch.

1. DBMS-X

A recent release of DBMS-X, a parallel SQL DBMS from a major relational database vendor was used. There is a TPC-H benchmark report, performed by the DBMS-X vendor, available on the TPC website (http://www.tpc.org/tpch/default.asp), which used the same release of DBMS-X installed. Therefore, as much as possible, the installation of DBMS-X was configured using parameters specified in the report. However, the vendor ran its benchmarks on a cluster with considerably more RAM and drives per node than the experimental cluster, thus some parameters were scaled down to reflect system resources. The system was installed on each node and configured to use 4 GB shared memory segments for the buffer pool and other temporary space. Furthermore, because all of the benchmarks were read-only and replication features in DBMS-X were not enabled, since this would not have improved performance and would have complicated the installation process.

2. Hive and Hadoop

Hive version 0.4.1 and Hadoop version 0.19.2, running on Java 1.6.0 were used. Both systems were configured according to suggestions described by members of Hive's development team in their report on running TPC-H on Hive (http://issues.apache.org/jira/browse/HIVE-600). To reflect system's hardware capacity, the number of map and reduce slots was adjusted to 2. In addition, HDFS block size was set to 256 MB. Compression of query intermediate data with the LZO native library version 2.03 was enabled.

3. Current Subject Matter's System 100

Portions of system 100 can be configured similarly as stated above except for the number of task slots, which was set to one. Thus, on each worker node, processes can use up to 2 GB of RAM. The other half of system's memory can be designated to the Ingres VectorWise DBMS, which was installed on each machine independently. Out of this memory, the buffer pool can be set to 400 MB and the rest can be available for query processing. All other parameters of database servers can remain unchanged. HadoopDB communicated with IVW using the standard JDBC driver shipped with Ingres. An early version of the Ingres VectorWise (IVW) system (http://www.ingres.com/vectorwise; http://www.vectorwise.com), based on the X100 research project (see, M. Zukowski, "Balancing Vectorized Query Execution with Bandwidth-Optimized Storage", Ph.D. Thesis, Universiteit van Amsterdam, Amsterdam, The Netherlands, 2009). IVW provides high performance in analytical queries due to vectorized operations on in-cache data and efficient I/O. The unique feature of the VectorWise (VW) database engine is its ability to take advantage of modern CPU capabilities such as SIMD instructions, commonly used in multimedia computation. This allows a data processing operation (such as a predicate evaluation) to occur on multiple values from a column simultaneously (on the same processor). Furthermore, in contrast to the tuple-at-a-time iterators traditionally employed by database systems, VW processes many values (typically vectors of length 1024) at once. Moreover, VectorWise makes an effort to keep the processed vectors in cache to reduce unnecessary RAM access. In the storage layer, Ingres VectorWise is a flexible column-store which allows avoiding reading attributes not needed in a query. To further reduce I/O bottleneck, automatic lightweight compression was applied. Finally, clustering indices and the exploitation of data correlations through sparse MinMax indices allow even more savings in I/O.

4. TPC-H Benchmark System

TPC-H (See, e.g., http://www.tpc.org/tpch) is a decision support benchmark that consists of a set of complex business analysis queries. The dataset models a global distribution company and includes the following tables: nation, region, supplier, part, partsupp, customer, orders, and lineitem. The benchmark ran at scaling factor SF=3000 (about 3 TB).

B. Data Preparation and Loading

The 3 TB of TPC-H benchmark data were generated using the dbgen program provided by TPC, running in parallel on every node. Each of the 45 nodes in the cluster received about 76 GB of raw data.

1. DBMS-X

According to the DBMS-X vendor suggestions, the DDL scripts from their TPC-H report were used to create the tables and indices, and to define the data distribution. All tables were hash-partitioned on their primary key, except for the partsupp table, which is hash-partitioned on the part key column, and the lineitem and orders tables, which were range-partitioned by month. The supplier and customer relations were indexed on their respective nation keys, as well as their primary key. The loading process included two steps. First, data was repartitioned and shuffled; second, the repartitioned data was bulk-loaded on each node. The DBMS-X loading utility, which was invoked on each node, directly consumed and transformed the data produced by the TPC-H data generator. The partitioning phase proceeded in parallel, but DBMS-X serialized each load phase and did not make full use of the disk bandwidth available to it. DBMS-X total load time was 33 h 3 min.

2. Hive and Hadoop

Hadoop's file system utility ran in parallel on all nodes and copied unaltered data files into HDFS under a separate directory for each table. Each file was automatically broken into 256 MB blocks and stored on a local data node. In addition, Hive DDL scripts were executed to put relational mapping on the files. The entire process took only 49 minutes.

3. Current Subject Matter's System 100

System 100 can also be loaded raw data into HDFS. Then, system 100's data loader utilities (implemented as MR jobs) performed global hash-partitioning across the cluster of each data file. In the case of the lineitem table, this two-operation process involved a join with the orders table to retrieve the customer key attribute needed for referential partitioning. Next, each node downloaded its partitions into a local file system. Finally, each group of collocated tables was broken into smaller chunks, which observe referential integrity constraints, with the maximum size of 3.5 GB. The entire partitioning process took 11 h 4 min with referential hash-partitioning was the most expensive part (6 h 42 min).

The chunked files were bulk-loaded in parallel into each instance of the Ingres VectorWise server using standard SQL COPY command. During this process data were also sorted according to the clustering index and IVW's internal indices were created. In the last step, the Ingres' optimizedb tool was run to generate statistics and histograms that would be used by the Ingres optimizer during query execution. Loading data into the databases took 3 h 47 min.

The data layout was as follows. The customer, orders, and lineitem tables were partitioned by the customer key and clustered by the nation key, order date, and order key, respectively. The part key attribute was used to both hash-partition and cluster the part and partsupp tables. The supplier table was partitioned by its primary key and clustered on the nation key. Small dictionary tables, region and nation, were not partitioned but collocated on one node (even though they are very small, they were not replicated since this violates TPC-H benchmarking rules). Their clustering indices were created using the region key attribute.

C. Benchmark System Query Execution

The above-referenced systems were tested against standard TPC-H queries from 1 to 20 (some of which are shown below). For DBMS-X and Hive, the queries were executed as specified in the appropriate reports for these systems. Since HiveQL syntax is a subset of SQL, in many cases the original TPC-H queries were rewritten into a series of simpler queries that in the last step produce the desired output. The current subject matter's system 100 implemented the queries using its API to ensure the employment of the execution strategies we discuss in this paper. All queries were parameterized using substitution values specified in the TPC-H report for query validation.

D. Results

Figure 7:
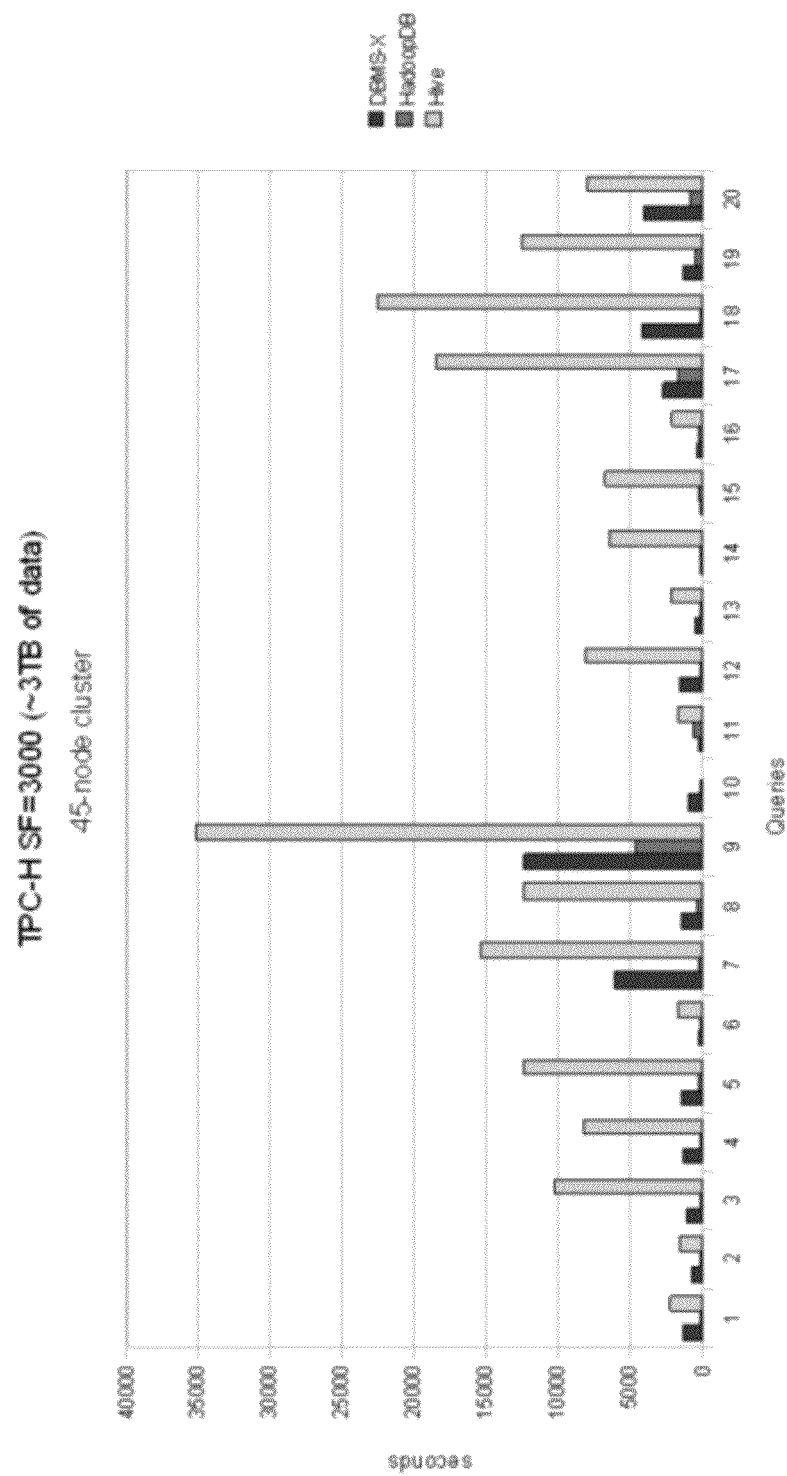
FIG. 7 is a plot illustrating comparison of execution of various TPC-H Queries using the system shown in FIG. 1 and other benchmarked systems.

FIG. 7 is a plot illustrating results of this benchmarking for all three experimental systems discussed above. The DBMS-X outperformed Hive in all queries. The main reason for the inferior performance of Hive was the lack of partitioning and indexing that helps during query execution. As a result of this limitation, every selection becomes a full data scan and most of the joins involved repartitioning and shuffling all records across the cluster.

As shown in FIG. 7, performance of the current subject matter's system was an order of magnitude faster than the parallel database systems. By leveraging highly optimized column-store single-node database systems and carefully generating query execution plans adjusted to the MapReduce framework, system 100 outperformed DBMS-X by a factor of 7.5 on average. Hive-based system performed on average 40 times slower than system 100. The following is a discussion of some of the TPC-H queries performed and their results.

1. Query 5

Figure 8:
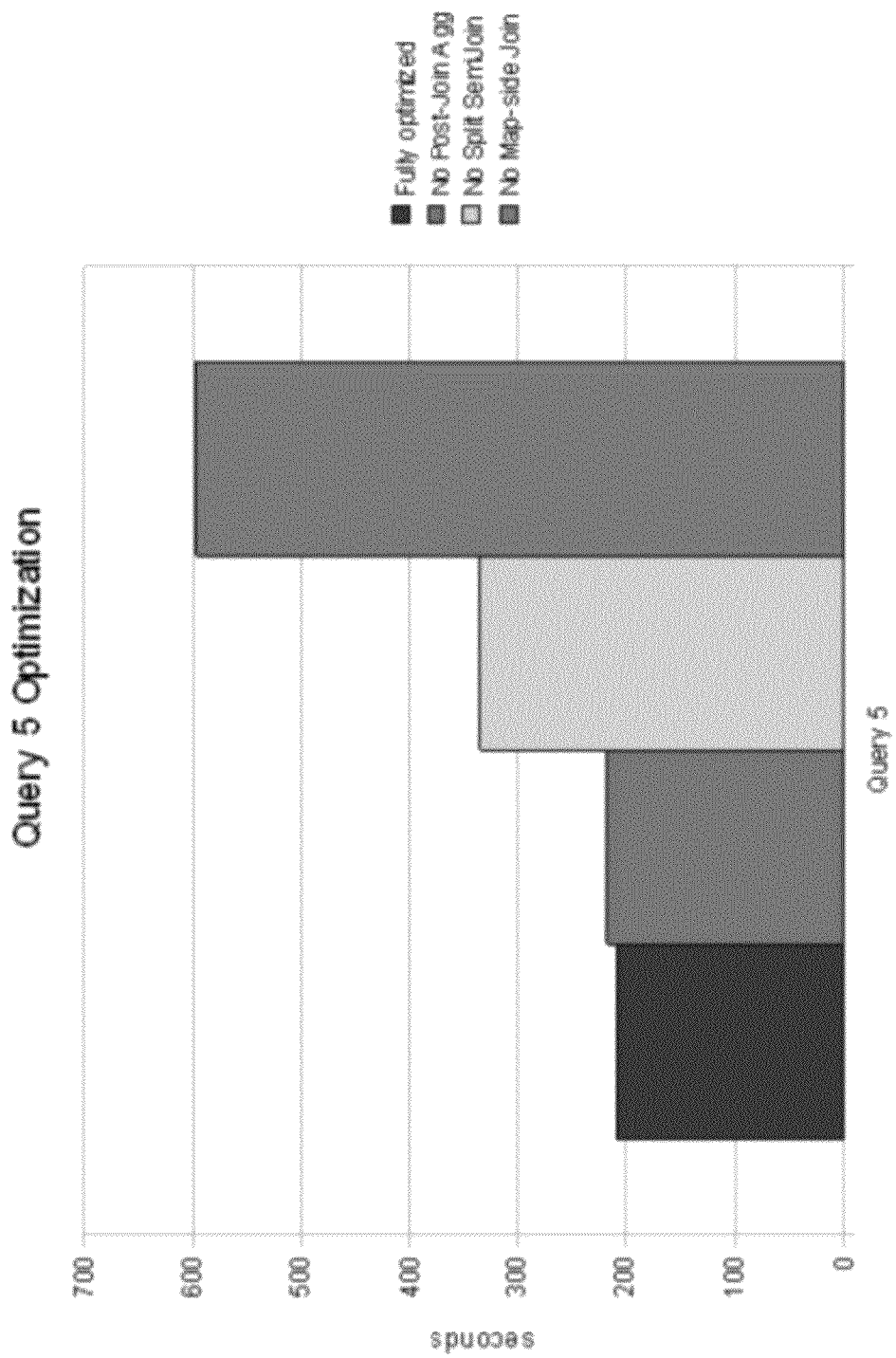
FIG. 8 is a plot illustrating comparison of execution of various TPC-H Query 5 using the system shown in FIG. 1 and other benchmarked systems.

The TPC-H Query 5 was executed in accordance with the following (FIG. 8 is a plot illustrating the query running time with each optimization turned off one by one):

```
select
    n_name,
    sum(l_extendedprice * (1 − l_discount)) as revenue
from
    customer,
    orders, lineitem,
    supplier,
    nation, region
where
    c_custkey = o_custkey
    and l_orderkey = o_orderkey
    and l_suppkey = s_suppkey
    and c_nationkey = s_nationkey
    and s_nationkey = n_nationkey
    and n_regionkey = r_regionkey
    and r_name = 'ASIA'
    and o_orderdate >= date '1994-01-01'
    and o_orderdate < date '1994-01-01'
    + interval '1' year
group by
    n_name
order by
    revenue desc
```

Query 5 involved joining six tables: customer, orders, lineitem, supplier, nation, and region. The fully optimized version used referential partitioning, split semijoin, and post-join aggregation. It involve one repartitioned join (the join with the supplier table). The implementation of this query included two MapReduce jobs, the first one performed the join and partial aggregation and the second job computed the global sum of revenue per nation.

During execution, the first optimization technique that was turned off was the post-join aggregation on the nation key. The amount of data that was written to HDFS between the two jobs increased from 5.2 KB to 83.8 MB. The effect on query running time was insignificant.

The next optimization that was turned off was the split semijoin technique (used for the joins of both the customer and supplier tables with the nation and region tables). System 100 therefore replaced the split semijoin with a regular Map-side join. This resulted in about 50% slowdown. The reason was that now the joins were performed outside of the database system (and could not take advantage of clustering indices on the nation key).

Finally, the Map-side join was turned off and replaced with the standard repartitioned join done in the Reduce phase. Now, the query running time doubled relative to the Map-side join and reached approximately a factor of 3 slowdown versus the fully optimized version. The entire operation of joining all the tables was achieved within one MR job, in view of the fact that the dictionary tables were brought into memory using the SideDB extension.

2. Query 7

Query 7 was executed as follows:

```
select
    supp_nation,
    cust_nation,
    l_year,
    sum(volume) as revenue
from
    (
        select
            n1.n_name as supp_nation,
            n2.n_name as cust_nation,
            extract(year from l_shipdate) as l_year,
            l_extendedprice * (1 - l_discount) as volume
        from
            supplier,
            lineitem,
            orders,
            customer,
            nation n1,
            nation n2
        where
            s_suppkey = l_suppkey
            and o_orderkey = l_orderkey
            and c_custkey = o_custkey
            and s_nationkey = n1.n_nationkey
            and c_nationkey = n2.n_nationkey
            and (
                (n1.n_name = 'FRANCE' and n2.n_name =
                'GERMANY')
                or (n1.n_name = 'GERMANY' and n2.n_name =
                'FRANCE')
            )
            and l_shipdate between date '1995-01-01'
                and date '1996-12-31'
    ) as shipping
group by
    supp_nation,
    cust_nation,
    l_year
order by
    supp_nation,
    cust_nation,
    l_year
```

This query involved joining 5 tables and computing per year aggregates of revenue volume between two chosen nations. Compared to DBMS-X, system 100 performed more joins locally because of referential partitioning and split semijoins (between the nation table and both customer and supplier tables). System 100 performed one repartitioned join, but after selective predicates on both groups of collocated tables. Overall, system 100 outperformed both DBMS-X (by a factor of 29) and Hive (by a factor of 74).

3. Query 8

Figure 9:
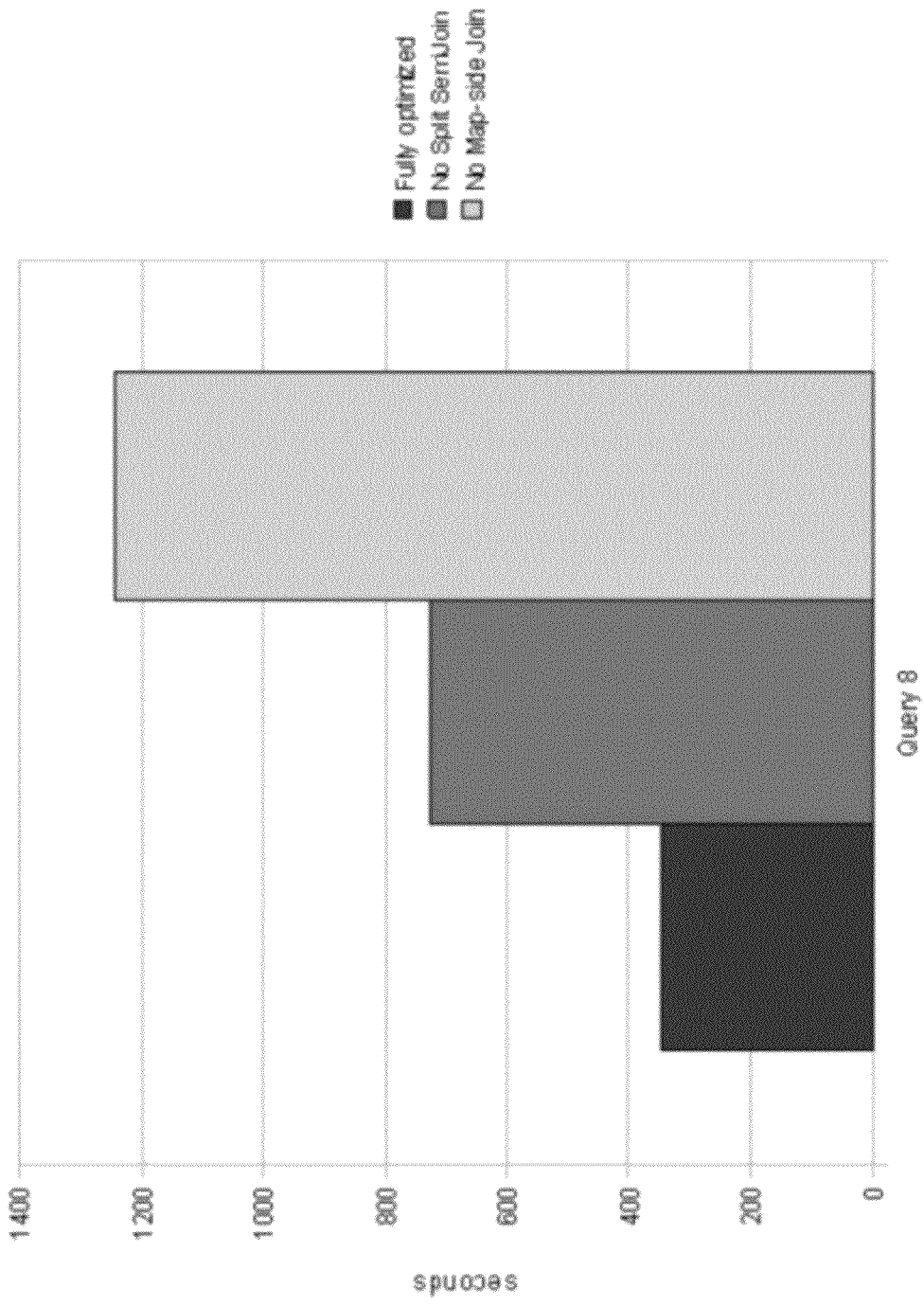
FIG. 9 is a plot illustrating comparison of execution of various TPC-H Query 8 using the system shown in FIG. 1 and other benchmarked systems.

FIG. 9 is a plot illustrating the results Query 8, which was executed in accordance with the following:

```
select
    o_year,
    sum(case
        when nation = 'BRAZIL' then volume
        else 0
    end) / sum(volume) as mkt_share
from
    (
        select
            extract(year from o_orderdate) as o_year,
            l_extendedprice * (1 - l_discount) as volume,
            n2.n_name as nation
        from
            part,
            supplier,
            lineitem,
            orders,
            customer,
            nation n1,
            nation n2,
            region
        where
            p_partkey = l_partkey
            and s_suppkey = l_suppkey
            and l_orderkey = o_orderkey
            and o_custkey = c_custkey
            and c_nationkey = n1.n_nationkey
            and n1.n_regionkey = r_regionkey
            and r_name = 'AMERICA'
            and s_nationkey = n2.n_nationkey
            and o_orderdate between date '1995-01-01'
                and date '1996-12-31'
            and p_type = 'ECONOMY ANODIZED STEEL'
    ) as all_nations
group by
    o_year
order by
    o_year
```

Similarly to Query 5, in Query 8, the join operation was moved to a later stage within a MapReduce job and thus, decreased performance. In executing this query, employing split semijoin (to restrict nations to those from the region of America) gave a factor of 2 speedup over the Map-side join and a factor of 3.6 over Reduce join. In particular, switching to the Map-side join resulted in a total of 5.5M of rows returned by all the databases combined (5 times more than in the split semi-join version). In both the split semijoin and the regular Map-side join cases, the same amount of intermediate data was written to disk between the Map and Reduce phases (around 315 GB). When performing a repartitioned join in the Reduce phase, the Hadoop job statistics page reports the total of 1.7 TB data written to local disks (which also needs to be shuffled across all the nodes).

4. Query 9

The TPC-H Query 9 was performed using the following code:

```
select
    nation,
    o_year,
    sum(amount) as sum_profit
from
    (
        select
            n_name as nation,
            extract(year from o_orderdate) as o_year,
            l_extendedprice * (1 - l_discount)
                - ps_supplycost * l_quantity as amount
        from
            part,
            supplier,
            lineitem,
            partsupp,
            orders,
            nation
        where
            s_suppkey = l_suppkey
            and ps_suppkey = l_suppkey
            and ps_partkey = l_partkey
            and p_partkey = l_partkey
            and o_orderkey = l_orderkey
            and s_nationkey = n_nationkey
            and p_name like '%green%'
    ) as profit
group by
    nation,
    o_year
order by
``` nation,
o_year desc

This query posed difficulties for each benchmarked system. Six tables were joined and there was only one selection predicate (on part table) to reduce the size of the data. Thus, the query involved scanning most of the data and shuffling it over the network in order to compute joins. Current subject matter's system 100 performed best because it used a column-store technique to avoid reading all columns off disk, and also because it was able to push three out of five joins into the local databases. This translated into a 2.66 shorter query running time when compared to DBMS-X, which in turn, outperformed Hive by a factor of 2.8.

5. Query 17

Figure 10:
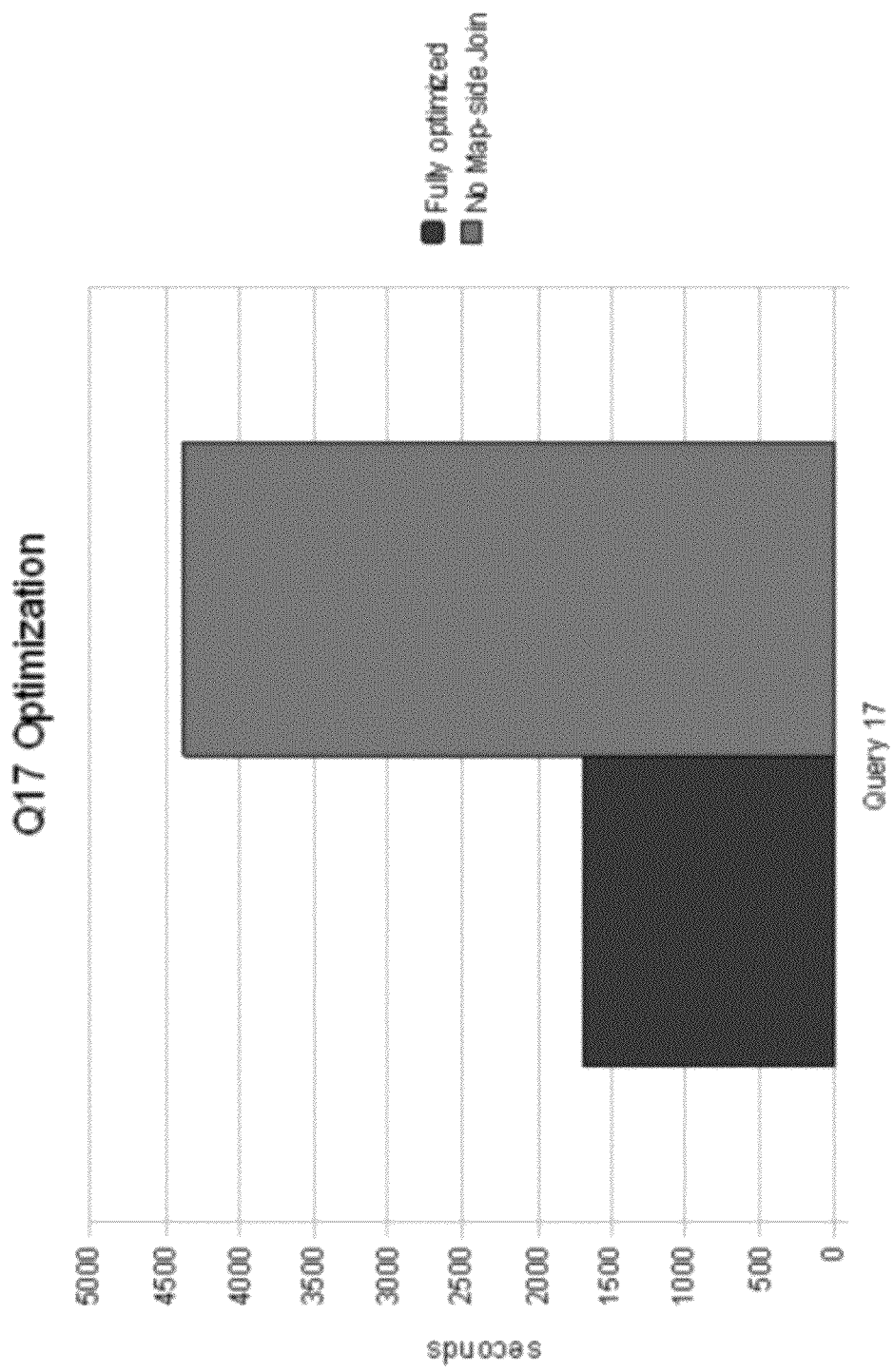
FIG. 10 is a plot illustrating comparison of execution of various TPC-H Query 17 using the system shown in FIG. 1 and other benchmarked systems.

Query 17's results are illustrated in FIG. 10. The query's code is as follows:

```
select
    sum(l_extendedprice) / 7.0 as avg_yearly
from
    lineitem,
    part
where
    p_partkey = l_partkey
    and p_brand = 'Brand#23'
    and p_container = 'MED BOX'
    and l_quantity < (
        select
            0.2 * avg(l_quantity)
        from
            lineitem
        where
            l_partkey = p_partkey
    )
```

Query 17 involved a join between the lineitem and part tables which were not collocated. This query involved repartitioning both tables and performing the join in Reduce. Very selective predicates were applied to the part table (69 GB of raw data), resulting in only 22 MB of data after the predicate was applied. Thus, the current subject matter's system broadcasted the result of the selection query on the part table to all nodes and employed the Map-side technique. In this way, HadoopDB avoided repartitioning the lineitem table. The gain was over a factor of 2.5 in total running time, as shown in FIG. 4.

6. Query 18

Finally, Query 18 was executed using the following:

```
select
    first 100 c_name,
        c_custkey,
        o_orderkey,
        o_orderdate,
        o_totalprice,
        sum(l_quantity)
from
    customer,
    orders,
    lineitem
where
    o_orderkey in (
        select
            l_orderkey
        from
            lineitem
        group by
            l_orderkey having
                sum(l_quantity) > 300
    )
    and c_custkey = o_custkey
    and o_orderkey = l_orderkey
group by
    c_name,
    c_custkey,
    o_orderkey,
    o_orderdate,
    o_totalprice
order by
    o_totalprice desc,
    o_orderdate
```

In this query system 100 again outperformed the two other systems. In the case of DBMS-X, the running time was 28.8 times longer than current subject matter's system. Hive was beaten by a factor of 151. System 100's highly efficient execution plan for this query benefits greatly from the referential partitioning (both the join and the sub-query of per order threshold on sum of line items quantity can be computed locally), resulting in having only one MR job to produce the desired output. DBMS-X and Hive both do repartitioned joins.

Example 2

The inventors of the current subject matter measured performance of system 1600 on the Lehigh University Benchmark (LUBM) (one of the most widely used benchmark of the Semantic Web community). For comparison, measurement of the performance of a simple hash partitioning version of system 1600, another horizontally scalable RDF-store (K. Rohloff and R. Schantz, "High-performance, massively scalable distributed systems using the mapreduce software framework: The shard triple-store. International Workshop on Programming Support Innovations for Emerging Distributed Applications," 2010. (hereinafter, referred to as "SHARD"), which also uses hash partitioning), and RDF-3X (T. Neumann and G. Weikum, "The rdf-3x engine for scalable management of rdf data," The VLDB Journal, 19:91-113, February 2010) running by itself on a single node. Experiments were conducted with both 1-hop and 2-hop guarantees, and measurements of how performance scales as the number of machines in the cluster scales from 1 machine to 20 machines was taken.

1. Experimental Setup

Except for the single-machine experiments, each of the systems were deployed on a 20-machine cluster. Each machine had a single 2.40 GHz Intel Core 2 Duo processor running 64-bit Red Hat Enterprise Linux 5 (kernel version 2.6.18) with 4 GB RAM and two 250 GB SATAI hard disks. According to hdparm, the hard disks deliver 74 MB/sec for buffered reads. All machines are on the same rack, connected via 1 Gbps network to a Cisco Catalyst 3750E-48TD switch.

2. Benchmark

The Lehigh University Benchmark ("LUBM" (Y. Guo, Z. Pan, and J. Heflin, "Lubm: A benchmark for owl knowledge base systems," J. Web Sem., 3(2-3):158-182, 2005) features an ontology for the university domain, synthetic OWL and RDF data scalable to an arbitrary size, and fourteen extensional queries representing a variety of properties. In this experiment, a dataset with 2000 universities was generated. The data size is around 50 GB in N-Triples format and contains around 270 million triples. As a measurement of query complexity, FIG. 24 illustrates numbers of joins in each query of the benchmark. Out of the 14 queries, 12 have joins, of which all 12 have at least one subject-subject join, and 6 of them also have at least one subject-object join.

3. Benchmarked Systems

A. RDF-3X

RDF-3X is a single-node RDF-store. It builds indexes over all possible permutations of subject, predicate and object. These indexes are highly compressed and leveraged by the query processor to perform efficient merge joins. The query optimizer in RDF-3X employs a cost model based on RDF-specific statistics to make the optimal choice for join orders. Its recent release also supports online and batch updates. RDF-3X version 0.3.5 was used.

B. SHARD

SHARD is an open-source, horizontally scalable triple store system. Its data processing and analytical frameworks are built using the Cloudera Distribution of the Hadoop implementation of the MapReduce formalism.

The system persists data in flat files in the HDFS file system such that each line of the triple-store text file represents all triples associated with a different subject. The query processing engine in SHARD iterates over the triple store data for each clause in the input SPARQL query, and incrementally attempts to bind query variables to literals in the triple data, while satisfying all of the query constraints. Each clause of the SPARQL query is processed in a separate MapReduce operation.

C. Graph Partitioning

Figure 20A:
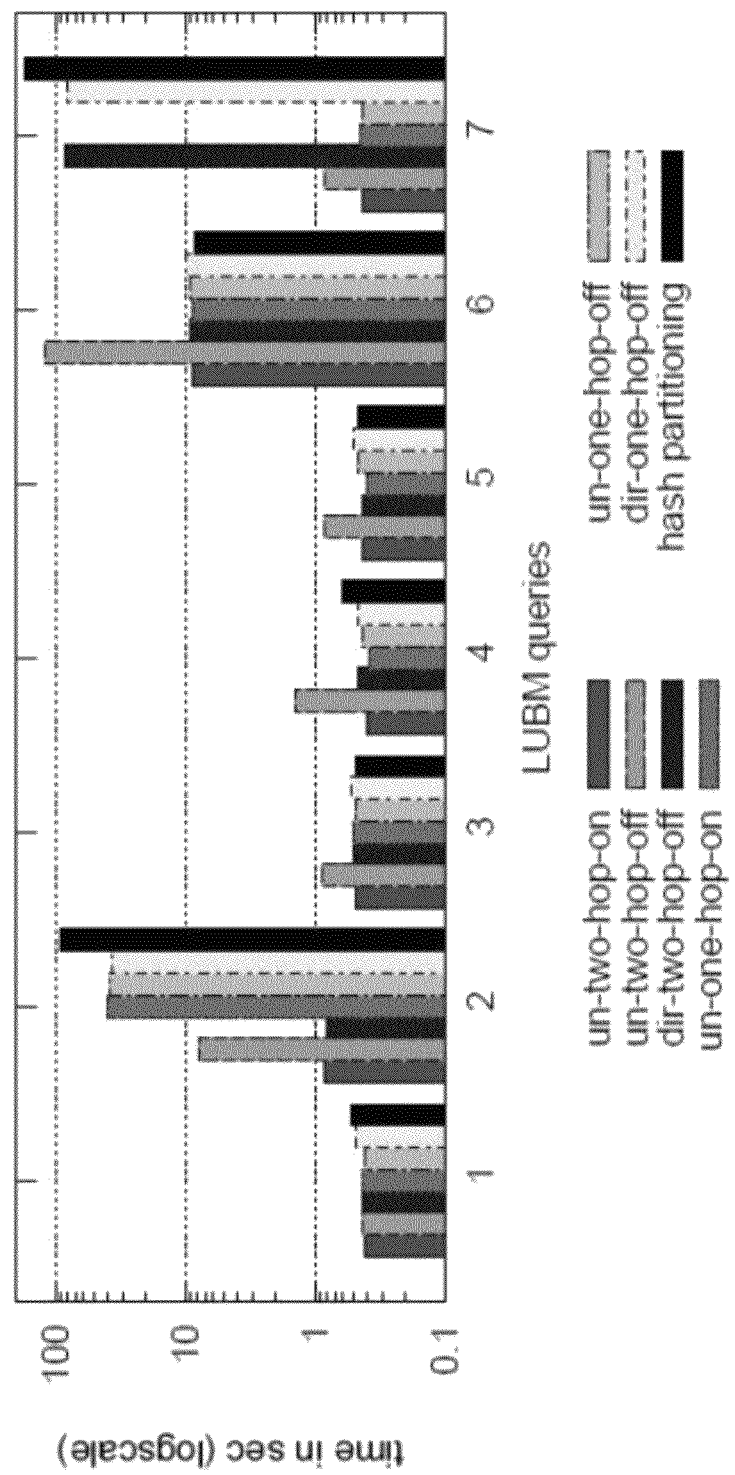
FIG. 20a-c are further plots illustrating comparison of executions of various queries.
Figure 20B:
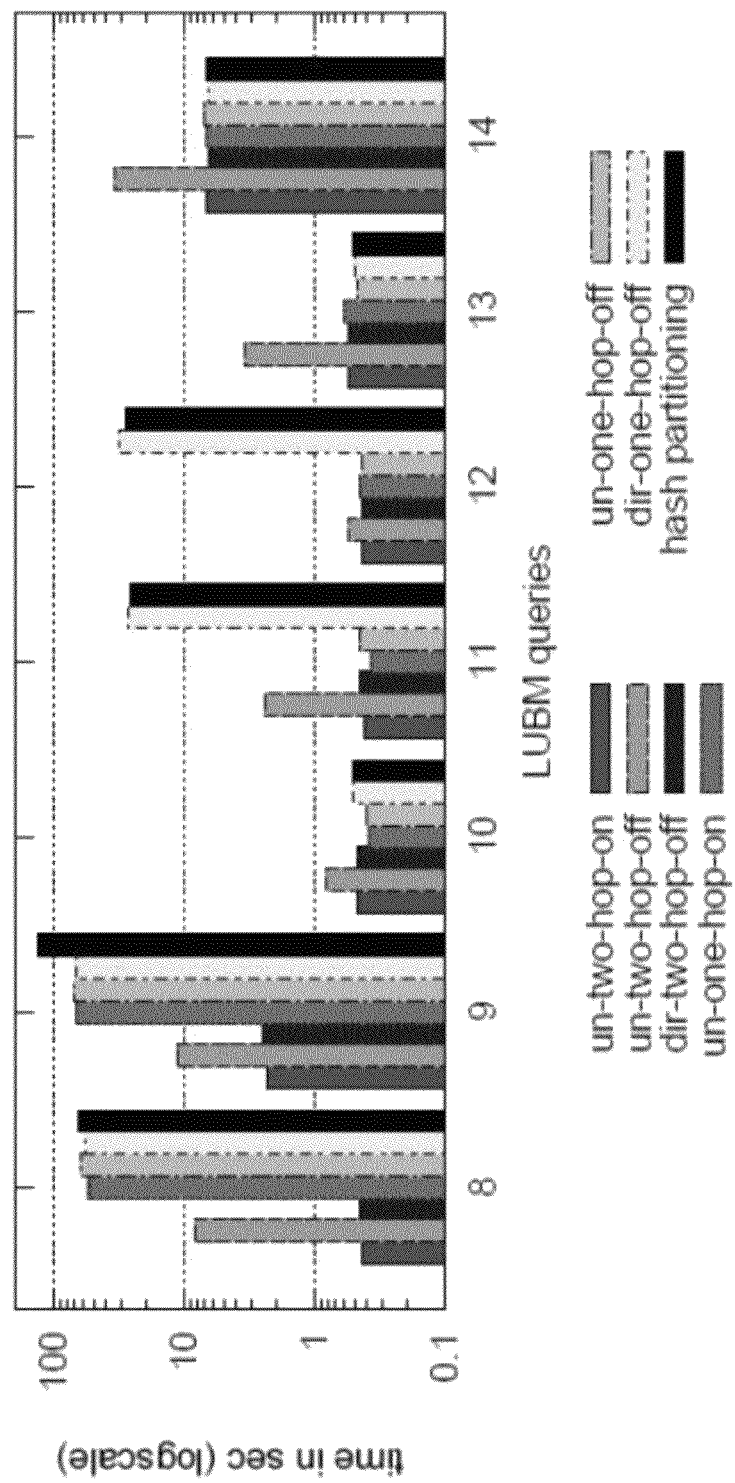

The experiments were conducted with the system 1600 in a graph partitioning mode. As discussed above, system 1600 can use an RDF store on each worker node 1604, attempt to parallelize SPARQL queries over RDF data partitioned across these nodes as much as possible, and use Hadoop to manage any redistribution of data that needs to occur at query time. Hadoop version 0.19.1 running on Java 1.6.0 was used. Its default configuration settings were used. RDF-3×0.3.5 store was also used, which can allow for a direct comparison of RDF-3X containing all data running on a single node, and a parallelized version of RDF-3X. Experiments were conducted with both 1-hop and 2-hop guarantees after the optimizations for high degree vertexes have been performed, as discussed above. FIGS. 20*a-b* illustrate performance of graph partitioning with these optimizations turned off. To evaluate how different parameters influence graph partitioning technique, four parameter configurations shown in FIG. 22 were used.

An impact of parameters on the data size was determined. FIG. 23 illustrates the triple counts and the normalized counts relative to hash partitioning (which has zero storage overhead since each triple exists in only one partition). The optimization techniques do not make much of a difference when there is only a 1-hop guarantee, but make a dramatic contribution to reducing the exponential data explosion problem for the 2-hop guarantee. The 2-hop guarantee with the optimizations turned on only stores an extra 20% of triples per partition, but turning off the optimizations results in nearly a factor of 10 data explosion.

A determination of how parameters influence query performance was made. FIGS. 20*a-b* illustrate performance of each configuration on the LUBM benchmark. It should be noted that data explosion caused by unchecked hop guarantees is not only a storage size problem, but it also affects performance. This is because larger numbers of triples per partition causes the query processor to scan larger intermediate datasets which slows down performance (for the same reason why RDF-3X scales poorly if it is run on a single machine). This is best seen by comparing two-hop-off and two-hop-on, which use identical query plans, but two-hop-off needs to store more triples per partition, which results in a significant slowdown in performance for the same "slow" queries that the single-node RDF-3X implementations struggled on in the previous section.

Reducing the hop guarantee from two to one causes three queries (queries 2, 8, and 9 as discussed below) to become non-PWOC for the graph partitioning technique. These queries are therefore slower than their counterparts in the two-hop guarantee, but they still outperform hash partitioning by up to 50% because one-hop still requires less data to be shipped over the network than hash partitioning. For the rest of the queries, one-hop-on/off and two-hop-on guarantees have similar performance.

Although a directed hop guarantee tends to store less data in each partition, it leads to more non-PWOC queries. Compared to the undirected one hop guarantee, the directed one hop guarantee has three more non-PWOC queries (7, 11 and 12) and hence much worse performance on these queries. For query 7, even the directed two hop guarantee fails to make it PWOC. Hence for this benchmark, undirected hop guarantees are better. But for other benchmarks, especially where the high degree optimization is less effective (because high degree vertexes are accessed more frequently the query workload), a directed hop guarantee would likely perform better relative to a undirected guarantee.

D. Hash Partitioning

The experiments were conducted with the system 1600 in a hash partitioning mode. The setup was identical to the "graph partitioning" mode above (many RDF-3X nodes sitting underneath Hadoop), except that the data is hash partitioned by RDF subject instead of using the graph partitioning algorithm. These results are included in the experiments to approximate the "best case scenario" for modern hash-partitioned scalable RDF-stores if they had used storage optimized for RDF (which is not the case today).

E. Hop Radius Table

For queries where the hop guarantee is not large enough to make the query PWOC, it is still possible to reduce the network communication that occurs during query decomposition and execution in Hadoop. In general, each partition contains a subgraph of the original graph. Informally, a n-hop guarantee ensures that for each vertex in a partition, all vertexes that are reachable within n hops of that vertex in the original graph are stored locally on the same machine in which the partition resides (either because these vertexes were originally part of the partition, or because they were replicated over to that machine to satisfy the hop guarantee). Vertexes close to the boundary of the partition subgraph are likely not going to be able to rely on reaching vertexes farther away than the hop guarantee. However, the vertexes around the center of the subgraph may have access to complete sets of vertexes that are a more than n hops away. To distinguish these two different cases and quantify the position of a vertex in a subgraph, a hop radius can be defined as follows:

Let $G=\{V, E\}$ be a graph, and $P_n$ be the n-hop guarantee for W, $P'_m$ be the m-hop guarantee for $\{v\}$, where $v \in W \subset V$ and $m \geq n$. If $P'_m \subseteq P_n$, then m is a hop radius for v in partition $P_n$.

Informally, a hop radius is a hop guarantee for a vertex in stead of a partition. A table can be maintained on each partition that lists the hop radius for each vertex (which is more than or equal to the hop guarantee). All vertexes in this table that has a hop radius larger than or equal to the DoFE of a query can be checked directly for a match between the SPARQL subgraph and a subgraph in the actual RDF data using that vertex as the "core". These vertexes can be checked completely in parallel, as if the query were PWOC. Only the remaining vertexes need to be checked via the query decomposition process described above.

Figure 20C:
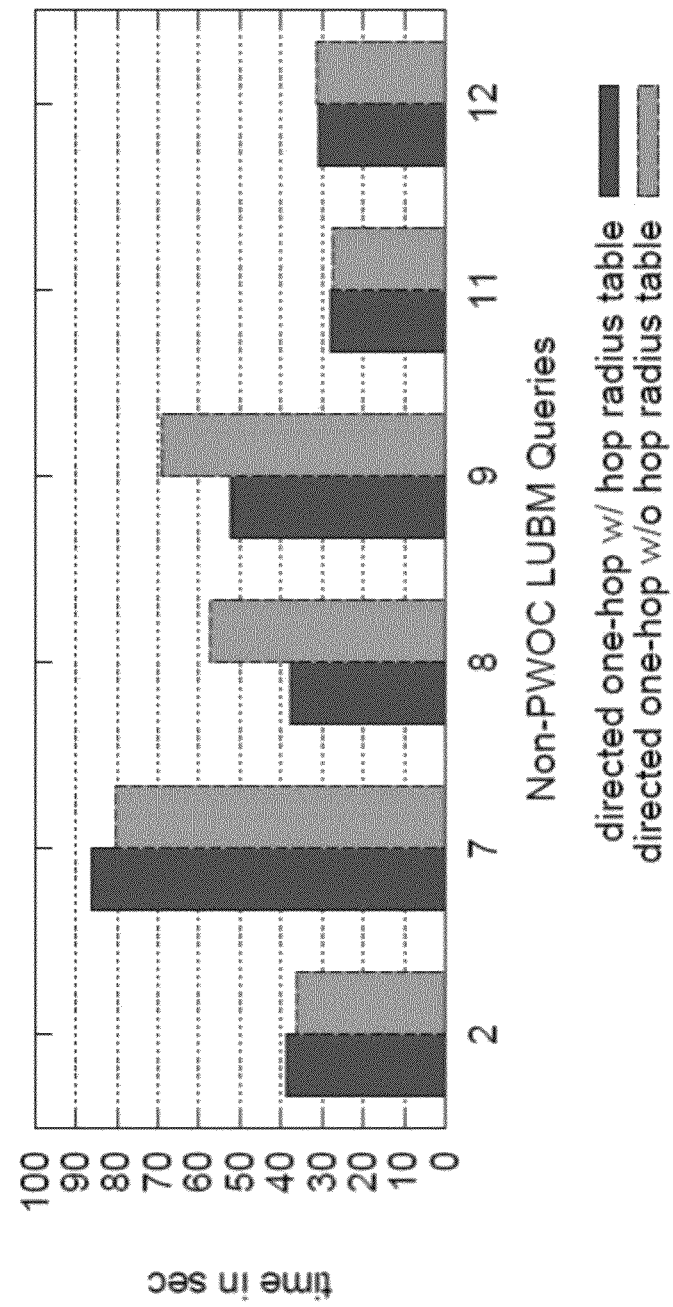

The following discussion of results relates to results for non-PWOC queries here because PWOC queries need not use a hop radius table. As can be seen in FIG. 20c, queries 8 and 9 perform roughly 20 seconds when a hop radius table is used to indicate which parts of the graph can be checked for sub-graph matching completely locally on individual nodes, thereby reducing the intermediate results that need to be shipped over the network for the query decomposition algorithm. However, some queries are not bottlenecked by network communication, and therefore perform similarly with or without hop radius table (e.g. queries 11 and 12).

4. Performance Comparison

Figure 18:
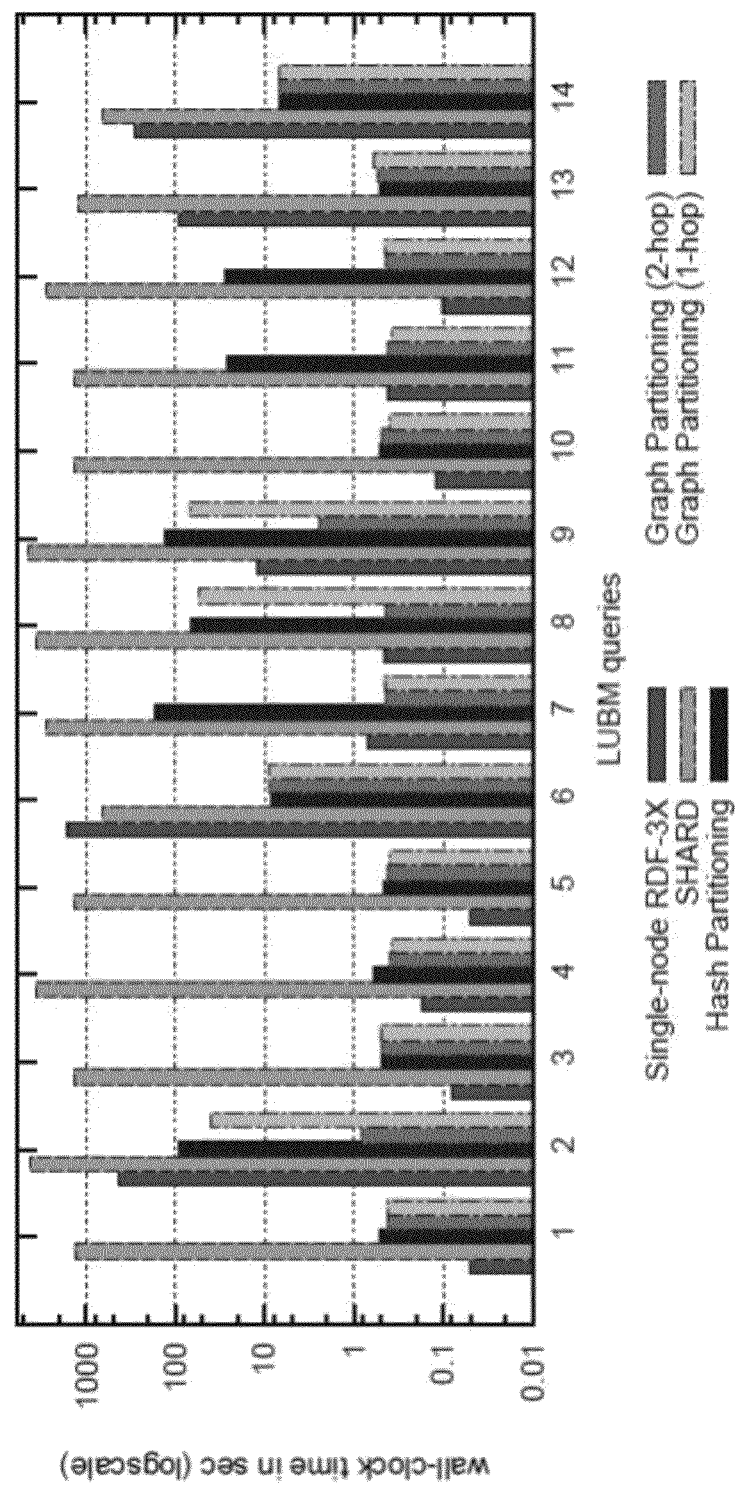
FIG. 18 is a plot illustrating comparison of executions of various queries.

FIGS. 18 and 21 illustrate execution times of fourteen queries performed on LUBM in the four benchmarked systems discussed above. Except for query 6, all queries take more time on SHARD than on the single-machine deployment of RDF-3X. This is because SHARD uses a hash partitioning technique that can only optimize subject-subject joins. Every other type of join requires a complete redistribution of data over the network within a Hadoop job, which is extremely expensive. Furthermore, its storage layer is not at all optimized for RDF data (it stores data in flat files) which is far from optimal.

To analyze the performance of system 1600, the queries were divided into two groups. Queries 1, 3, 4, 5, 7, 8, 10, 11 and 12 ran for less than 1 second on single-machine RDF-3X, and were referred to as "fast queries". Queries 2, 6, 9, 13 and 14 ran for more than 10 seconds on single-machine RDF-3X, and were referred to as "slow queries".

For fast queries (queries that require little more than a few index lookups), the large size of the data set was not problematic since the data size is significantly reduced before a scan is required, so adding more machines and partitioning data across them did not improve the performance. Thus, it was slightly better to run these queries on a single machine than in parallel on multiple machines, due to the network communication delay needed to get these parallel queries started and aggregate results. These "fast" queries took a minimum 0.4 to 0.5 seconds on the multi-machine implementations just for this communication.

For slow queries (queries that require scans of large amounts of intermediate data), the single machine implementation sees significant scalability limitations, and partitioning the data across multiple machines dramatically improved performance. The improvement ranged from 5 times (query 9) to 500 times (query 2) faster.

Changing the hop guarantee for the graph partitioning technique from 1-hop to 2-hop only had an effect for three queries (2, 8 and 9) since the 1-hop guarantee was sufficient to make most of the queries PWOC on this benchmark. The 2-hop guarantee was sufficient to turn all joins into PWOC joins, since no SPARQL query in the benchmark had a graph pattern diameter larger than 4. This allowed all queries to be performed completely in parallel for the 2-hop graph partitioning implementation.

Comparing graph and hash partitioning allowed one to directly see the benefit of the current subject matter's graph partitioning technique. Hash partitioning was only able to avoid network communication for queries containing only subject-subject joins (or no join at all). However, for queries with subject-object joins, the hash partitioning approach had to ship data across the network to perform the join, which added significant latency for data redistribution and Hadoop processing. Additional subject-object joins resulted in additional cross-machine joins, which result in further slowdown.

For instance, queries 8, 11 and 12 had only one subject-object join and take up to 90 seconds; while queries 2, 7 and 9 have two or three subject-object joins and took up to 170 seconds.

For queries with no subject-object joins (1, 3, 4, 5, 6, 10, 13 and 14), where all joins were PWOC joins for both hash partitioning and graph partitioning, hash partitioning sometimes performed slightly better than graph partitioning, since the graph partitioning algorithm required an additional join per query to filter out sub-graph matches that were centered on vertex that was not a base vertex of a partition (the technique that removes duplicate results).

5. Varying Number of Machines

Figure 19:
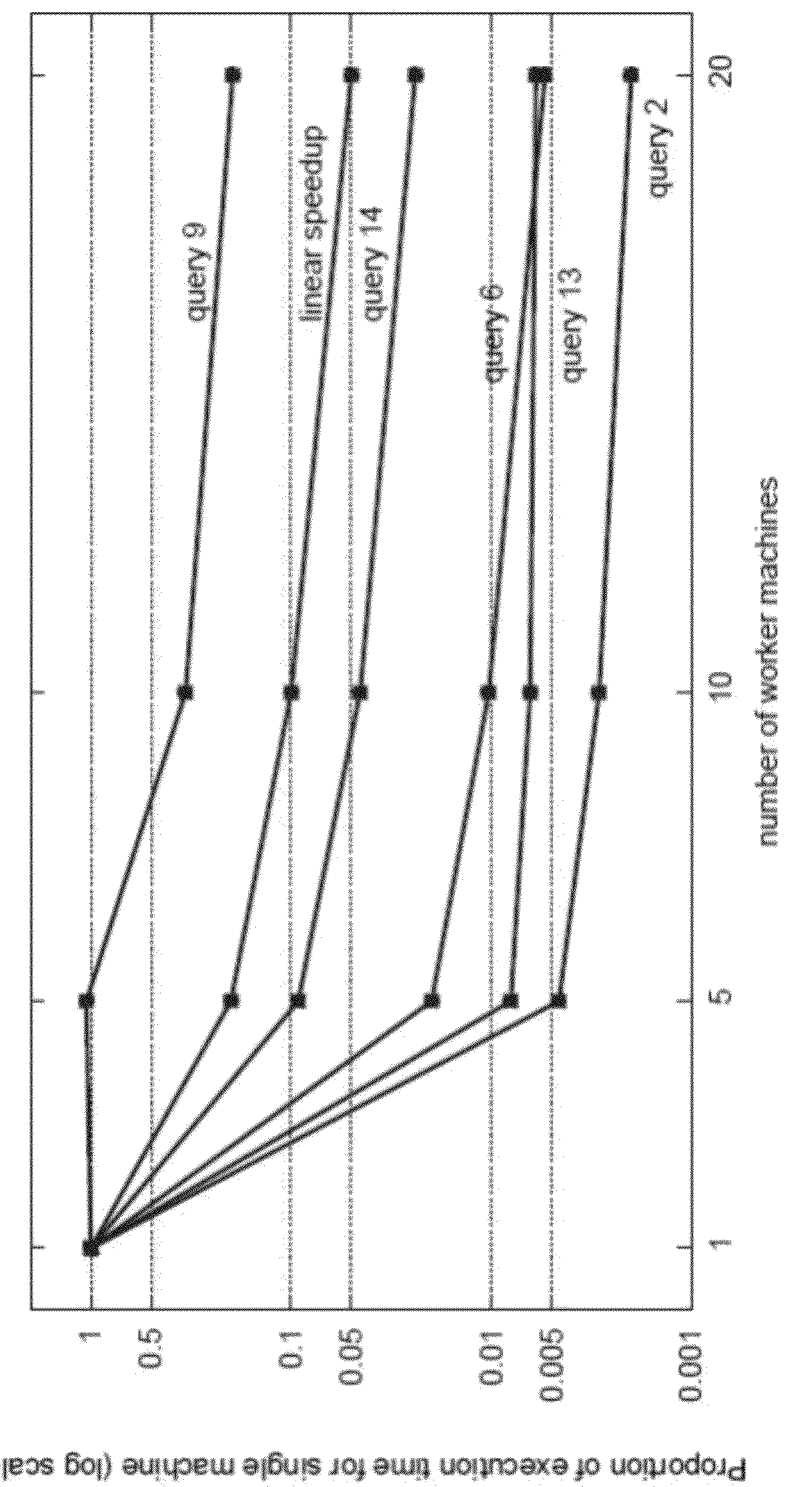
FIG. 19 is another plot illustrating comparison of executions of various queries.

To explore the performance of the system 1600, the number of machines in the cluster was varied and LUBM (2000) was ran on clusters with 1, 5, 10, and 20 worker machines. The optimized 2-hop guarantee version of graph partitioning was benchmarked FIG. 19 illustrates experimental results for selected queries. Execution time was normalized using single-machine implementation as the baseline (all lines start at 1) and the relative performance for the multi-machine cluster was calculated. A line showing a theoretical system that achieves linear speedup is included in FIG. 19 (0.2, 0.1 and 0.05 for 5-, 10- and 20-machine clusters, respectively) for comparison. Except for query 9, all queries presented in FIG. 19 exceeded linear speedup. This is because scaling out the cluster caused the working dataset on each machine to be small enough to fit into main memory, which dramatically reduced the needed disk input/output.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Some of the essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Example embodiments of the methods and components of the current subject matter have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the current subject matter should not be limited by any of the above-described exemplary embodiments, but should be defined only in accordance with the following claims and their equivalents.

What is claimed:

1. A computer-implemented method for processing a query, having at least one query parameter, of data stored on a plurality of nodes in accordance with a graph data model, each node including at least one of a processor and a memory, the graph data model includes a plurality of vertexes configured to be logically connected using a plurality of edges, each vertex in the plurality of vertexes is configured to correspond to a portion of data, wherein the portion of data is configured to be stored at a node in the plurality of nodes and at least one vertex in the plurality of vertexes is configured to be logically connected to at least another vertex in the plurality of vertexes using at least one edge in the plurality of edges, wherein two vertexes logically connected by an edge are configured to form a triple in a plurality of triples, the method comprising:

partitioning the stored data into a plurality of partitions based on at least one vertex in the plurality of vertexes and at least one logical connection of the at least one vertex to at least another vertex;

storing at least another triple in the plurality of triples on the at least one node;

determining other vertexes logically connected to the at least one vertex;

selectively replicating triples containing the determined vertex to the at least one node for processing;

assigning, based on the triple containing the at least one vertex, at least one partition in the plurality of partitions corresponding to the triple to at least one node in the plurality of nodes; and processing, based on the assigning, the query by processing the plurality of partitions;

wherein at least one of the partitioning, the storing, the determining, the selectively replicating, the assigning, and the processing is performed on at least one processor.

2. The method according to claim 1, further comprising determining whether triples already existing in the partition and the replicated triples include duplicative triples; and
excluding duplicative triples from the processing.

3. The method according to claim 1, wherein the graph data model is a directed graph data model.

4. The method according to claim 3, wherein the graph data model includes a resource description framework data.

5. The method according to claim 1, wherein the processing further comprises excluding processing of triples contained within partitions wherein the triples have a predetermined type.

6. The method according to claim 1, further comprising determining whether the at least one vertex is configured to be logically connected to other vertexes contained in the plurality of nodes using a plurality of logical connections, wherein the plurality of logical connections is configured to exceed a predetermined threshold; and
excluding, based on the determining, the at least one other vertex having the plurality of logical connections exceeding the predetermined threshold from the partitioning.

7. The method according to claim 1, further comprising determining whether the received query can be processed in parallel on the plurality of nodes; and
dividing, based on the determining, the received query into a plurality of sub-queries.

8. The method according to claim 1, wherein the plurality of partitions includes a plurality of disjoint partitions.

9. The method according to claim 1, wherein the triple is stored in a memory of at least one node in the plurality of nodes.

10. The method according to claim 1, wherein the at least one query parameter includes at least one of the following: at least one constant parameter and at least one variable parameter.

11. The method according to claim 10, further comprising determining a sub-graph pattern of the query parameters, wherein two query parameters and a logical connection between the two query parameters are configured to form a query triple in a plurality of query triples;
comparing the sub-graph pattern of the query parameters to the graph data model containing the plurality of vertexes by comparing the plurality of triples in the graph data model to the plurality of query triples;
determining, based on the comparing,
  whether an identical match exists between at least one triple in the plurality of triples in the graph data model and at least one query triple in the plurality of query triples when the query triple includes two constant parameters configured to match two vertexes in the at least one triple in the plurality of triples in the graph data model;
  a vertex in the plurality of vertexes in the graph data model to match a variable parameter in a query triple in the plurality of query triples, the query triple including a constant parameter and the variable parameter and the constant parameter is configured to match another vertex in the plurality vertexes.

12. The method according to claim 10, wherein the variable parameter includes at least one of the following: at least one edge in the plurality of edges and at least one vertex in the plurality of vertexes;
wherein a sub-graph query can be configured to include at least one of the following: at least one constant vertex, at least one constant edge, at least one variable vertex, and at least one variable edge, wherein at least one constant vertex and at least one constant edge is configured to match at least one vertex and at least one edge in the graph data mode, respectively.

13. The method according to claim 1, wherein the processing is configured to be performed in parallel using Apache Hadoop.

14. A system for processing a query, having at least one query parameter, of data stored on a plurality of nodes in accordance with a graph data model, each node including at least one of a processor and a memory, the graph data model includes a plurality of vertexes configured to be logically connected using a plurality of edges, each vertex in the plurality of vertexes is configured to correspond to a portion of data, wherein the portion of data is configured to be stored at a node in the plurality of nodes and at least one vertex in the plurality of vertexes is configured to be logically connected to at least another vertex in the plurality of vertexes using at least one edge in the plurality of edges, wherein two vertexes logically connected by an edge are configured to form a triple in a plurality of triples, the system comprising:
  at least one programmable processor; and
  a non-transitory machine-readable medium storing instructions that, when executed by the at least one programmable processor, cause the at least one programmable processor to perform operations comprising:
    partition the stored data into a plurality of partitions based on at least one vertex in the plurality of vertexes and at least one logical connection of the at least one vertex to at least another vertex;
    storing at least another triple in the plurality of triples on the at least one node;
    determining other vertexes logically connected to the at least one vertex;
    selectively replicating triples containing the determined vertex to the at least one node for processing;
    assigning, based on the triple containing the at least one vertex, at least one partition in the plurality of partitions corresponding to the triple to at least one node in the plurality of nodes; and
    processing, based on the assigning, the query by processing the plurality of partitions.

15. The system according to claim 14, wherein the operations further comprise
  determining whether triples already existing in the partition and the replicated triples include duplicative triples; and
  excluding duplicative triples from the processing.

16. The system according to claim 14, wherein the graph data model is a directed graph data model.

17. The system according to claim 16, wherein the graph data model includes a resource description framework data.

18. The system according to claim 14, wherein the processing further comprises excluding processing of triples contained within partitions wherein the triples have a predetermined type.

19. The system according to claim 14, wherein the operations further comprise
  determining whether the at least one vertex is configured to be logically connected to other vertexes contained in the plurality of nodes using a plurality of logical connections, wherein the plurality of logical connections is configured to exceed a predetermined threshold; and
  excluding, based on the determining, the at least one other vertex having the plurality of logical connections exceeding the predetermined threshold from the partitioning.

20. The system according to claim 14, wherein the operations further comprise
  determining whether the received query can be processed in parallel on the plurality of nodes; and
  dividing, based on the determining, the received query into a plurality of sub-queries.

21. The system according to claim 14, wherein the plurality of partitions includes a plurality of disjoint partitions.

22. The system according to claim 14, wherein the triple is stored in a memory of at least one node in the plurality of nodes.

23. The system according to claim 14, wherein the at least one query parameter includes at least one of the following: at least one constant parameter and at least one variable parameter.

24. The system according to claim 23, wherein the operations further comprise
  determining a sub-graph pattern of the query parameters, wherein two query parameters and a logical connection between the two query parameters are configured to form a query triple in a plurality of query triples;
  comparing the sub-graph pattern of the query parameters to the graph data model containing the plurality of vertexes by comparing the plurality of triples in the graph data model to the plurality of query triples;
  determining, based on the comparing,
    whether an identical match exists between at least one triple in the plurality of triples in the graph data model and at least one query triple in the plurality of query triples when the query triple includes two constant parameters configured to match two vertexes in the at least one triple in the plurality of triples in the graph data model;
    a vertex in the plurality of vertexes in the graph data model to match a variable parameter in a query triple in the plurality of query triples, the query triple including a constant parameter and the variable parameter and the constant parameter is configured to match another vertex in the plurality vertexes.

25. The system according to claim 23, wherein the variable parameter includes at least one of the following: at least one edge in the plurality of edges and at least one vertex in the plurality of vertexes;
wherein a sub-graph query can be configured to include at least one of the following: at least one constant vertex, at least one constant edge, at least one variable vertex, and at least one variable edge, wherein at least one constant vertex and at least one constant edge is configured to match at least one vertex and at least one edge in the graph data mode, respectively.

26. The system according to claim 14, wherein the processing is configured to be performed in parallel using Apache Hadoop.

27. A computer program product for processing a query, having at least one query parameter, of data stored on a plurality of nodes in accordance with a graph data model, each node including at least one of a processor and a memory, the graph data model includes a plurality of vertexes configured to be logically connected using a plurality of edges, each vertex in the plurality of vertexes is configured to correspond to a portion of data, wherein the portion of data is configured to be stored at a node in the plurality of nodes and at least one vertex in the plurality of vertexes is configured to be logically connected to at least another vertex in the plurality of vertexes using at least one edge in the plurality of edges, wherein two vertexes logically connected by an edge are configured to form a triple in a plurality of triples, the computer program product comprising a non-transitory machine-readable medium storing instructions that, when executed by at least one programmable processor, cause the at least one programmable processor to perform operations comprising:
partitioning the stored data into a plurality of partitions based on at least one vertex in the plurality of vertexes and at least one logical connection of the at least one vertex to at least another vertex;
storing at least another triple in the plurality of triples on the at least one node;
determining other vertexes logically connected to the at least one vertex;
selectively replicating triples containing the determined vertex to the at least one node for processing;
assigning, based on the triple containing the at least one vertex, at least one partition in the plurality of partitions corresponding to the triple to at least one node in the plurality of nodes; and
processing, based on the assigning, the query by processing the plurality of partitions.

28. The computer program product according to claim 27, wherein the operations further comprise
determining whether triples already existing in the partition and the replicated triples include duplicative triples; and
excluding duplicative triples from the processing.

29. The computer program product according to claim 27, wherein the graph data model is a directed graph data model.

30. The computer program product according to claim 29, wherein the graph data model includes a resource description framework data.

31. The computer program product according to claim 27, wherein the processing further comprises excluding processing of triples contained within partitions wherein the triples have a predetermined type.

32. The computer program product according to claim 27, wherein the operations further comprise
determining whether the at least one vertex is configured to be logically connected to other vertexes contained in the plurality of nodes using a plurality of logical connections, wherein the plurality of logical connections is configured to exceed a predetermined threshold; and
excluding, based on the determining, the at least one other vertex having the plurality of logical connections exceeding the predetermined threshold from the partitioning.

33. The computer program product according to claim 27, wherein the operations further comprise
determining whether the received query can be processed in parallel on the plurality of nodes; and
dividing, based on the determining, the received query into a plurality of sub-queries.

34. The computer program product according to claim 27, wherein the plurality of partitions includes a plurality of disjoint partitions.

35. The computer program product according to claim 27, wherein the triple is stored in a memory of at least one node in the plurality of nodes.

36. The computer program product according to claim 27, wherein the at least one query parameter includes at least one of the following: at least one constant parameter and at least one variable parameter.

37. The computer program product according to claim 36, wherein the operations further comprise
determining a sub-graph pattern of the query parameters, wherein two query parameters and a logical connection between the two query parameters are configured to form a query triple in a plurality of query triples;
comparing the sub-graph pattern of the query parameters to the graph data model containing the plurality of vertexes by comparing the plurality of triples in the graph data model to the plurality of query triples;
determining, based on the comparing,
whether an identical match exists between at least one triple in the plurality of triples in the graph data model and at least one query triple in the plurality of query triples when the query triple includes two constant parameters configured to match two vertexes in the at least one triple in the plurality of triples in the graph data model;
a vertex in the plurality of vertexes in the graph data model to match a variable parameter in a query triple in the plurality of query triples, the query triple including a constant parameter and the variable parameter and the constant parameter is configured to match another vertex in the plurality vertexes.

38. The computer program product according to claim 36, wherein the variable parameter includes at least one of the following: at least one edge in the plurality of edges and at least one vertex in the plurality of vertexes;
wherein a sub-graph query can be configured to include at least one of the following: at least one constant vertex, at least one constant edge, at least one variable vertex, and at least one variable edge, wherein at least one constant vertex and at least one constant edge is configured to match at least one vertex and at least one edge in the graph data mode, respectively.

39. The computer program product according to claim 27, wherein the processing is configured to be performed in parallel using Apache Hadoop.

* * * * *